United States Patent
Gombolay et al.

(10) Patent No.: US 12,450,534 B2
(45) Date of Patent: Oct. 21, 2025

(54) HETEROGENEOUS GRAPH ATTENTION NETWORKS FOR SCALABLE MULTI-ROBOT SCHEDULING

(71) Applicant: Georgia Tech Research Corporation, Atlanta, GA (US)

(72) Inventors: Matthew C. Gombolay, Atlanta, GA (US); Zheyuan Wang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 348 days.

(21) Appl. No.: 17/380,132

(22) Filed: Jul. 20, 2021

(65) Prior Publication Data
US 2022/0226994 A1    Jul. 21, 2022

Related U.S. Application Data

(60) Provisional application No. 63/053,958, filed on Jul. 20, 2020, provisional application No. 63/053,954, filed on Jul. 20, 2020.

(51) Int. Cl.
G06Q 10/0631    (2023.01)
B25J 9/16    (2006.01)

(52) U.S. Cl.
CPC ...... *G06Q 10/06313* (2013.01); *B25J 9/1656* (2013.01); *G05B 2219/32335* (2013.01); *G05B 2219/39001* (2013.01)

(58) Field of Classification Search
None
See application file for complete search history.

(56) References Cited

U.S. PATENT DOCUMENTS

| | | | | |
|---|---|---|---|---|
| 5,666,518 A | * | 9/1997 | Jumper | G06N 3/049 706/26 |
| 9,304,817 B2 | * | 4/2016 | Kim | G06F 9/5038 |
| 9,454,157 B1 | * | 9/2016 | Hafeez | G05D 1/104 |
| 9,569,736 B1 | * | 2/2017 | Ghesu | G06N 20/00 |
| 9,821,455 B1 | * | 11/2017 | Bareddy | G06Q 10/06 |
| 10,282,864 B1 | * | 5/2019 | Kim | G06T 9/002 |

(Continued)

FOREIGN PATENT DOCUMENTS

WO    WO-2020130909 A1 *    6/2020    ........... G01C 21/383

OTHER PUBLICATIONS

Wang et al Learning to dynamically coordinate multi-robot teams in graph attention networks arXiv 1912.0205, Dec. 4, 2019 https://arxiv.org/abs/1912.02059 (Year: 2019).*

(Continued)

*Primary Examiner* — Octavian Rotaru
(74) *Attorney, Agent, or Firm* — Meunier Carlin & Curfman LLC

(57) ABSTRACT

An exemplary scheduler system and method are disclosed that can schedule a plurality of heterogenous robots to perform a set of tasks using heterogeneous graph attention network models. The exemplary scheduler system and method can outperform other work in multi-robot scheduling both in terms of schedule optimality and the total number of feasible schedules found and also in a scalable framework that can be trained via imitation-based Q-learning operations. The exemplary scheduler system and method can autonomously learn scheduling policies on multiple application domains.

13 Claims, 12 Drawing Sheets

(56) References Cited

U.S. PATENT DOCUMENTS

| | | | |
|---|---|---|---|
| 11,079,245 B1* | 8/2021 | Niewiadomski ... | G01C 21/3492 |
| 2002/0118207 A1* | 8/2002 | Jagla ............... | H04L 45/48 345/581 |
| 2005/0188376 A1* | 8/2005 | Matsumoto ......... | G06Q 10/06 718/100 |
| 2009/0265299 A1* | 10/2009 | Hadad ............... | G06N 5/02 706/55 |
| 2010/0094459 A1* | 4/2010 | Cho ................. | G05D 1/0291 700/248 |
| 2010/0222924 A1* | 9/2010 | Gienger ............. | G05B 19/42 706/12 |
| 2010/0262574 A1* | 10/2010 | Zhou ................ | G06N 5/02 707/E17.05 |
| 2014/0088763 A1* | 3/2014 | Hazan ............... | B25J 9/1666 700/255 |
| 2014/0207282 A1* | 7/2014 | Angle ............... | B25J 13/006 901/1 |
| 2016/0232445 A1* | 8/2016 | Srinivasan ......... | G06N 3/047 |
| 2017/0076201 A1* | 3/2017 | van Hasselt ........ | G06N 3/08 |
| 2017/0154261 A1* | 6/2017 | Sunehag ............ | G06N 3/08 |
| 2018/0101957 A1* | 4/2018 | Talathi ............. | G06T 9/00 |
| 2018/0165603 A1* | 6/2018 | Van Seijen ......... | G06N 3/045 |
| 2018/0173563 A1* | 6/2018 | Hu .................. | G06F 9/4881 |
| 2018/0253837 A1* | 9/2018 | Ghesu ............... | G06T 7/0012 |
| 2019/0094532 A1* | 3/2019 | Jabbour ............. | G02B 27/0012 |
| 2019/0230046 A1* | 7/2019 | Djukic .............. | H04L 47/76 |
| 2019/0392001 A1* | 12/2019 | Carothers ........... | G06N 3/049 |
| 2020/0003886 A1* | 1/2020 | Cho ................. | G01S 13/588 |
| 2020/0012382 A1* | 1/2020 | Lee ................. | G06N 3/08 |
| 2020/0027006 A1* | 1/2020 | Gupta ............... | G06N 5/01 |
| 2020/0104714 A1* | 4/2020 | Lee ................. | G06N 3/08 |
| 2020/0301013 A1* | 9/2020 | Banerjee ............ | G01S 17/931 |
| 2020/0303266 A1* | 9/2020 | Jeong ............... | H01L 22/26 |
| 2021/0012767 A1* | 1/2021 | Kupryjanow ........ | G10L 21/0208 |
| 2021/0065440 A1* | 3/2021 | Sunkavalli .......... | G06T 7/90 |
| 2021/0073912 A1* | 3/2021 | Da Silva ........... | G06N 3/045 |
| 2021/0103286 A1* | 4/2021 | Wang ............... | G05D 1/0214 |
| 2021/0110262 A1* | 4/2021 | Schmitt ............. | G06N 3/045 |
| 2021/0124344 A1* | 4/2021 | Hu .................. | G05B 23/0283 |
| 2021/0271253 A1* | 9/2021 | Liu ................. | G05D 1/0248 |
| 2021/0306005 A1* | 9/2021 | Sheiman ............. | H03M 13/13 |
| 2021/0365782 A1* | 11/2021 | Huang ............... | A63F 13/45 |
| 2021/0383176 A1* | 12/2021 | Wu .................. | G06V 30/274 |
| 2021/0383534 A1* | 12/2021 | Tadross ............. | G06V 10/454 |
| 2021/0398014 A1* | 12/2021 | Cao ................. | G06N 7/01 |
| 2022/0067640 A1* | 3/2022 | George .............. | G06Q 10/087 |
| 2022/0164659 A1* | 5/2022 | Song ................ | G06F 16/283 |
| 2022/0188632 A1* | 6/2022 | Culurciello ......... | G06F 18/211 |
| 2022/0269254 A1* | 8/2022 | Putman .............. | G05B 19/423 |
| 2022/0355051 A1* | 11/2022 | Srinivasan ......... | G16H 50/20 |
| 2022/0390256 A1* | 12/2022 | Pan ................. | G01C 21/3837 |
| 2022/0398921 A1* | 12/2022 | Jaggi ............... | G08G 1/0116 |
| 2022/0412275 A1* | 12/2022 | Waldhart ............ | F02D 19/0628 |
| 2023/0085147 A1* | 3/2023 | Melnikov ........... | B60W 60/0027 701/26 |
| 2023/0182296 A1* | 6/2023 | Sermanet ............ | B25J 9/163 700/245 |
| 2023/0326599 A1* | 10/2023 | Togawa .............. | G16H 20/10 705/2 |

OTHER PUBLICATIONS

Wang et al, Heterogeneous graph attention network. In The world wide web conference pp. 2022-2032, May 13, 2019 https://dl.acm.org/doi/abs/10.1145/3308558.3313562 (Year: 2019).*

Zhao et al, Deep reinforcement learning for user association and resource allocation in heterogeneous cellular networks, IEEE Transactions on Wireless Communications 18, No. 11, pp. 5141-5152, Aug. 13, 2019 https://ieeexplore.ieee.org/abstract/document/8796358 (Year: 2019).*

C. Heyer, "Human-robot interaction and future industrial robotics applications," in 2010 IEEE/RSJ International Conference on Intelligent Robots and Systems. IEEE, 2010, pp. 4749-4754.

H. Raghavan, O. Madani, and R. Jones, "Active learning with feedback on features and instances," Journal of Machine Learning Research, vol. 7, No. Aug, pp. 1655-1686, 2006.

E. Khalil, H. Dai, Y. Zhang, B. Dilkina, and L. Song, "Learning combinatorial optimization algorithms over graphs," in Advances in Neural Information Processing Systems, 2017, pp. 6348-6358.

W. Kool, H. van Hoof, and M. Welling, "Attention, learn to solve routing problems!" in International Conference on Learning Representations, 2019.

P. Velickovic, G. Cucurull, A. Casanova, A. Romero, P. Lio, and Y. Bengio, "Graph Attention Networks," International Conference on Learning Representations, 2018.

R. Dechter, I. Meiri, and J. Pearl, "Temporal constraint networks," Artificial intelligence, vol. 49, No. 1-3, pp. 61-95, 1991.

E. Nunes, M. Manner, H. Mitiche, and M. Gini, "A taxonomy for task allocation problems with temporal and ordering constraints," Robotics and Autonomous Systems, vol. 90, pp. 55-70, 2017.

G. A. Korsah, A. Stentz, and M. B. Dias, "A comprehensive taxonomy for multi-robot task allocation," The International Journal of Robotics Research, vol. 32, No. 12, pp. 1495-1512, 2013.

P. Brucker, A. Drexl, R. Mohring, K. Neumann, and E. Pesch, "Resourceconstrained project scheduling: Notation, classification, models, and methods," European journal of operational research, vol. 112, No. 1, pp. 3-41, 1999.

J. F. Benders, "Partitioning procedures for solving mixed-variables programming problems," Numerische mathematik, vol. 4, No. 1, pp. 238-252, 1962.

J. Chen and R. G. Askin, "Project selection, scheduling and resource allocation with time dependent returns," European Journal of Operational Research, vol. 193, No. 1, pp. 23-34, 2009.

W. Tan and B. Khoshnevis, "A linearized polynomial mixed integer programming model for the integration of process planning and scheduling," Journal of Intelligent Manufacturing, vol. 15, No. 5, pp. 593-605, 2004.

A. Kushleyev, D. Mellinger, C. Powers, and V. Kumar, "Towards a swarm of agile micro quadrotors," Autonomous Robots, vol. 35, No. 4, pp. 287-300, 2013.

S. M. Mousavi and R. Tavakkoli-Moghaddam, "A hybrid simulated annealing algorithm for location and routing scheduling problems with cross-docking in the supply chain," Journal of Manufacturing Systems, vol. 32, No. 2, pp. 335-347, 2013.

L. Zhang and T. Wong, "An object-coding genetic algorithm for integrated process planning and scheduling," European Journal of Operational Research, vol. 244, No. 2, pp. 434-444, 2015.

W. Zhang and T. G. Dietterich, "A reinforcement learning approach to jobshop scheduling," in Proceedings of the International Joint Conference on Artificial Intelligence, 1995, pp. 1114-1120.

Y.-C. Wang and J. M. Usher, "Application of reinforcement learning for agent-based production scheduling," Engineering Applications of Artificial Intelligence, vol. 18, No. 1, pp. 73-82, 2005.

J. Wu, X. Xu, P. Zhang, and C. Liu, "A novel multi-agent reinforcement learning approach for job scheduling in grid computing," Future Generation Computer Systems, vol. 27, No. 5, pp. 430-439, 2011.

H. Mao, M. Schwarzkopf, S. B. Venkatakrishnan, Z. Meng, and M. Iizadeh, "Learning scheduling algorithms for data processing clusters," in Proceedings of the ACM Special Interest Group on Data Communication, 2019, pp. 270-288.

M. Gasse, D. Chetelat, N. Ferroni, L. Charlin, and A. Lodi, "Exact combinatorial optimization with graph convolutional neural networks," in Advances in Neural Information Processing Systems, 2019, pp. 15 554-15 566.

J. Zhou, G. Cui, Z. Zhang, C. Yang, Z. Liu, and M. Sun, "Graph neural networks: A review of methods and applications," arXiv preprint arXiv:1812.08434, 2018.

L. Barbulescu, Z. B. Rubinstein, S. F. Smith, and T. L. Zimmerman, "Distributed coordination of mobile agent teams: the advantage of planning ahead," in Proceedings of the 9th International Conference on Autonomous Agents and Multiagent Systems: vol. 1-vol. 1, 2010, pp. 1331-1338.

B. Coltin and M. Veloso, "Online pickup and delivery planning with transfers for mobile robots," in Workshops at the Twenty-Seventh AAAI Conference on Artificial Intelligence, 2013.

(56) References Cited

OTHER PUBLICATIONS

E. Nunes and M. Gini, "Multi-robot auctions for allocation of tasks with temporal constraints," in Twenty-Ninth AAAI Conference on Artificial Intelligence, 2015.
M. C. Gombolay, R. J. Wilcox, and J. A. Shah, "Fast scheduling of robot teams performing tasks with temporospatial constraints," IEEE Transactions on Robotics, vol. 34, No. 1, pp. 220-239, 2018.
I. Tsamardinos and M. E. Pollack, "Efficient solution techniques for disjunctive temporal reasoning problems," Artificial Intelligence, vol. 151, No. 1-2, pp. 43-89, 2003.
C. H. Papadimitriou and K. Steiglitz, Combinatorial optimization: algorithms and complexity. Courier Corporation, 1998.
B. Piot, M. Geist, and O. Pietquin, "Boosted bellman residual minimization handling expert demonstrations," in Joint European Conference on Machine Learning and Knowledge Discovery in Databases. Springer, 2014, pp. 549-564.
A. Paszke, S. Gross, S. Chintala, G. Chanan, E. Yang, Z. DeVito, Z. Lin, A. Desmaison, L. Antiga, and A. Lerer, "Automatic differentiation in PyTorch," in NIPS Autodiff Workshop, 2017.
D. P. Kingma and J. Ba, "Adam: A method for stochastic optimization," arXiv preprint arXiv:1412.6980, 2014.
H. Hellerman, "Some principles of time-sharing scheduler strategies," IBM Systems Journal, vol. 8, No. 2, pp. 94-117, 1969.
S. Wilson, P. Glotfelter, L. Wang, S. Mayya, G. Notomista, M. Mote, and M. Egerstedt, "The robotarium: Globally impactful opportunities, challenges, and lessons learned in remote-access, distributed control of multirobot systems," IEEE Control Systems Magazine, vol. 40, No. 1, pp. 26-44, Feb. 2020.
Wang, Zheyuan, and Matthew Gombolay. "Learning scheduling policies for multi-robot coordination with graph attention networks." IEEE Robotics and Automation Letters 5, No. 3 (Jun. 2020): 4509-4516.
Elkin Castro and Sanja Petrovic. Combined mathematical programming and heuristics for a radiotherapy pretreatment scheduling problem. Journal of Scheduling, 15 (3):333-346, 2012.
Imen Essafi, Yazid Mati, and Stephane Dauzere-Peres. A genetic local search algorithm for minimizing total weighted tardiness in the job-shop scheduling problem. Computers & Operations Research, 35(8):2599-2616, 2008.
Robert W Floyd. Algorithm 97: shortest path. Communications of the ACM, 5(6):345, 1962.
Eduardo Feo Flushing, Luca M Gambardella, and Gianni A Di Caro. Simultaneous task allocation, data routing, and transmission scheduling in mobile multirobot teams. In 2017 IEEE/RSJ International Conference on Intelligent Robots and Systems (IROS), pp. 1861-1868. IEEE, 2017.
Yann LeCun, Yoshua Bengio, and Geoffrey Hinton. Deep learning. nature, 521(7553):436-444, 2015.
Adam Paszke, et al., PyTorch: An Imperative Style, High-Performance Deep Learning Library. In Advances in Neural Information Processing Systems 32, pp. 8024-8035, 2019.
Huizhi Ren and Lixin Tang. An improved hybrid milp/cp algorithm framework for the job-shop scheduling. In 2009 IEEE International Conference on Automation and Logistics, pp. 890-894. IEEE, 2009.
Marius M Solomon. On the worst-case performance of some heuristics for the vehicle routing and scheduling problem with time window constraints. Networks, 16(2): 161-174, 1986.
Minjie Wang, Lingfan Yu, Da Zheng, Quan Gan, Yu Gai, Zihao Ye, Mufei Li, Jinjing Zhou, Qi Huang, Chao Ma, Ziyue Huang, Qipeng Guo, Hao Zhang, Haibin Lin, Junbo Zhao, Jinyang Li, Alexander J Smola, and Zheng Zhang. Deep Graph Library: Towards Efficient and Scalable Deep Learning on Graphs. ICLR Workshop on Representation Learning on Graphs and Manifolds, 2019.
Xiao Wang, Houye Ji, Chuan Shi, Bai Wang, Yanfang Ye, Peng Cui, and Philip S Yu. Heterogeneous graph attention network. In The World Wide Web Conference, pp. 2022-2032. ACM, 2019.
Zheyuan Wang and Matthew Gombolay. Learning to Dynamically Coordinate Multi-Robot Teams in Graph Attention Networks. arXiv preprint arXiv:1912.02059, 2019.
Keyulu Xu, Weihua Hu, Jure Leskovec, and Stefanie Jegelka. How Powerful are Graph Neural Networks? In International Conference on Learning Representations, 2019.
Zhi Yan, Nicolas Jouandeau, and Arab Ali Cherif. A survey and analysis of multi-robot coordination. International Journal of Advanced Robotic Systems, 10(12):399, 2013.
Bengio Y, Lodi A, Prouvost A (2020) Machine learning for combinatorial optimization: a methodological tour d'horizon. European Journal of Operational Research.
Bogner K, Pferschy U, Unterberger R, Zeiner H (2018) Optimised scheduling in human-robot collaboration-a use case in the assembly of printed circuit boards. International Journal of Production Research 56(16):5522,5540.
Casalino A, Zanchettin AM, Piroddi L, Rocco P (2019) Optimal scheduling of human-robot collaborative assembly operations with time petri nets. IEEE Transactions on Automation Science and Engineering Castro E, Petrovic S (2012).
Choudhury S, Gupta J, Kochenderfer MJ, Sadigh D, Bohg J (2020) Dynamic multi-robot task allocation under uncertainty and temporal constraints. In: Proceedings of Robotics: Science and Systems (RSS), DOI 10.15607/rss.2020.xvi.068.
Fout A, Byrd J, Shariat B, Ben-Hur A (2017) Protein interface prediction using graph convolutional networks. In: Advances in neural information processing systems, pp. 6530-6539.
Hamaguchi T, Oiwa H, Shimbo M, Matsumoto Y (2017) Knowledge transfer for out-of-knowledge-base entities:A graph neural network approach. arXiv preprint arXiv:170605674.
Hamilton WL, Ying R, Leskovec J (2018) Inductive representation learning on large graphs. 1706.02216.
Hari SKK, Nayak A, Rathinam S (2020) An approximation algorithm for a task allocation, sequencing and scheduling problem involving a human-robot team. IEEE Robotics and Automation Letters 5(2):2146, 2153.
Johnson DB (1977) Efficient algorithms for shortest paths in sparse networks. Journal of the ACM (JACM) 24(1):1,13.
Kartal B, Nunes E, Godoy J, Gini M (2016) Monte carlo tree search with branch and bound for multi-robot task allocation. In: The IJCAI-16 workshop on autonomous mobile service robots, vol. 33.
Nikou A, Boskos D, Tumova J, Dimarogonas DV (2017) Cooperative planning for coupled multi-agent systems under timed temporal specifications. In: 2017 American Control Conference (ACC), IEEE, pp. 1847,1852.
Shiue YR, Lee KC, Su CT (2018) Real-time scheduling for a smart factory using a reinforcement learning approach. Computers & Industrial Engineering 125:604,614.
Solovey K, Bandyopadhyay S, Rossi F, Wolf MT, Pavone M (2020) Fast near-optimal heterogeneous task allocation via flow decomposition. arXiv preprintar Xiv:201103603.
Tang G, Webb P (2019) Human-robot shared workspace in aerospace factories. Human-robot interaction: safety, standardization, and benchmarking pp. 71-80.
Wang H, Chen W, Wang J (2020) Coupled task scheduling for heterogeneous multi-robot system of two robot types performing complex-schedule order fulfillment tasks. Robotics and Autonomous Systems p. 103560.
Wang Y, Sun Y, Liu Z, Sarma SE, Bronstein MM, Solomon JM (2019c) Dynamic graph cnn for learning on point clouds. ACM Transactions On Graphics (tog) 38(5):1,12.
Wang Z, Gombolay M (2020) Heterogeneous graph attention networks for scalable multi-robot scheduling with temporospatial constraints. In: Robotics: Science and System XVI.
Wu Z, Pan S, Chen F, Long G, Zhang C, Philip SY (2020) A comprehensive survey on graph neural networks. IEEE Transactions on Neural Networks and Learning Systems.
Yan S, Xiong Y, Lin D (2018) Spatial temporal graph convolutional networks for skeleton-based action recognition. In: Proceedings of the AAAI Conference on Artificial Intelligence, vol. 32, pp. 7444,7452.
Yang X, Deng C, Liu T, Tao D (2020) Heterogeneous graph attention network for unsupervised multiple-target domain adaptation. IEEE Transactions on Pattern Analysis and Machine Intelligence.
Zhang S, Chen Y, Zhang J, Jia Y (2020) Real-time adaptive assembly scheduling in human-multi-robot collaboration according

(56) References Cited

OTHER PUBLICATIONS to human capability. In: 2020 IEEE International Conference on Robotics and Automation (ICRA), IEEE, pp. 3860,3866.

* cited by examiner

Algorithm 1: Solve a problem instance using ScheduleNet via scheduling-through-simulation

Input: Problem components $<r, \tau, d, w, Loc>$, maximum allowed time $t_{max}$
Output: A schedule generated by ScheduleNet
1 Initialize all robots' partial schedules as $\emptyset$;
2 Initialize problem state $x$ with $<r, \tau, d, w, Loc>$;
3 $t \leftarrow 0$;
4 while $t \leq t_{max}$ do
5     Collects all available robots at $t$ into $r_{avail}$;
6     $r \leftarrow \text{pickRobot}(r_{avail})$;
7     while $r \neq NULL$ do
8         Collect all unscheduled tasks at $t$ into $\tau_{avail}$;
9         if $\tau_{avail} \neq \emptyset$ then
10             Build the heterogeneous graph $g$ from $x$;
11             Generate input features for nodes in $g$;
12             Run ScheduleNet on $g$ to predict $Q_\theta(x, u)$;
13             $\tau \leftarrow \text{argmax}_{\tau \in \tau_{avail}} Q_\theta(x, u)|_{u=<\tau,r>}$;
14             Append $\tau$ into $r$'s partial schedule and update $x$;
15             if $x$ *becomes infeasible* then
16                 Exit with an infeasible schedule;
17             else if *all tasks have been assigned* then
18                 Exit with a feasible schedule;
19             end
20             Remove $r$ from $r_{avail}$;
21             $r \leftarrow \text{pickRobot}(r_{avail})$;
22         else
23             break;
24         end
25     end
26     $t \leftarrow t + 1$;
27 end
28 Exit with an infeasible schedule;

FIG. 2A

Algorithm 2: Construct the heterogeneous graph for modeling homogeneous robot teams

Input: STN, locations $Loc$, robots $r$ and their partial schedules, available actions $u_{avail}$
Output: Heterogeneous graph representation 1. Run Johnson's algorihtm on STN to find its minimum distance graph, $g_d$;
2. Remove all $f_i$'s from $g_d$, except $f_0$;
3. Use $g_d$ as the new STN and $s_i$ as the task node of $\tau_i$;
4. foreach *robot* $r_j$ do
5.     Add a robot node, $r_j$;
6.     foreach $\tau_m$ *assigned to* $r_j$ do
7.         Add an edge $\tau_m \rightarrow r_j$;
8.     end
9. end
10. Connect robot nodes with each other;
11. foreach *location* $L_k$ do
12.     Add a location node, $L_k$;
13.     foreach $\tau_m$ *located in* $L_k$ do
14.         Add an edge $\tau_m \rightarrow L_k$;
15.     end
16. end
17. Connect location nodes with each other;
18. Add a state node $st$, connect all other nodes to it;
19. foreach $u_n = <\tau_n, r_n> \in u_{avail}$ do
20.     Add a value nodes $v_n$;
21.     Add an edge $\tau_n \rightarrow v_n$;
22.     Add an edge $r_n \rightarrow v_n$;
23.     Add an edge $st \rightarrow v_n$;
24. end
25. Add self-loops;
26. return $g_d$.

FIG. 2B

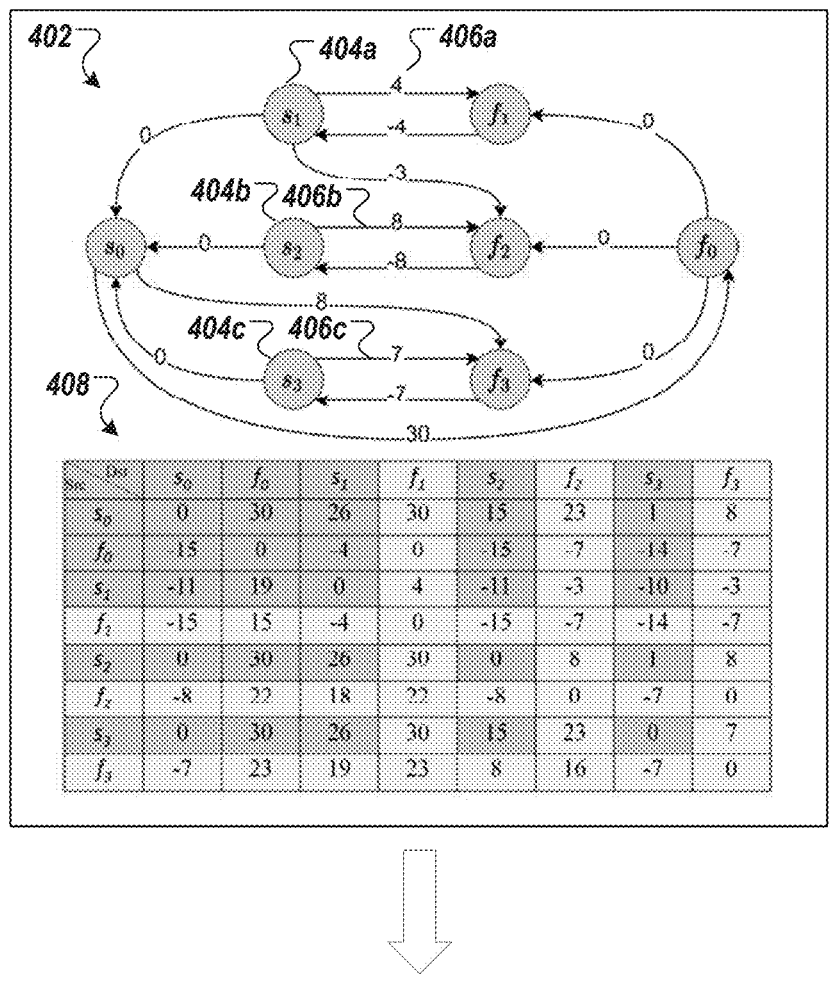
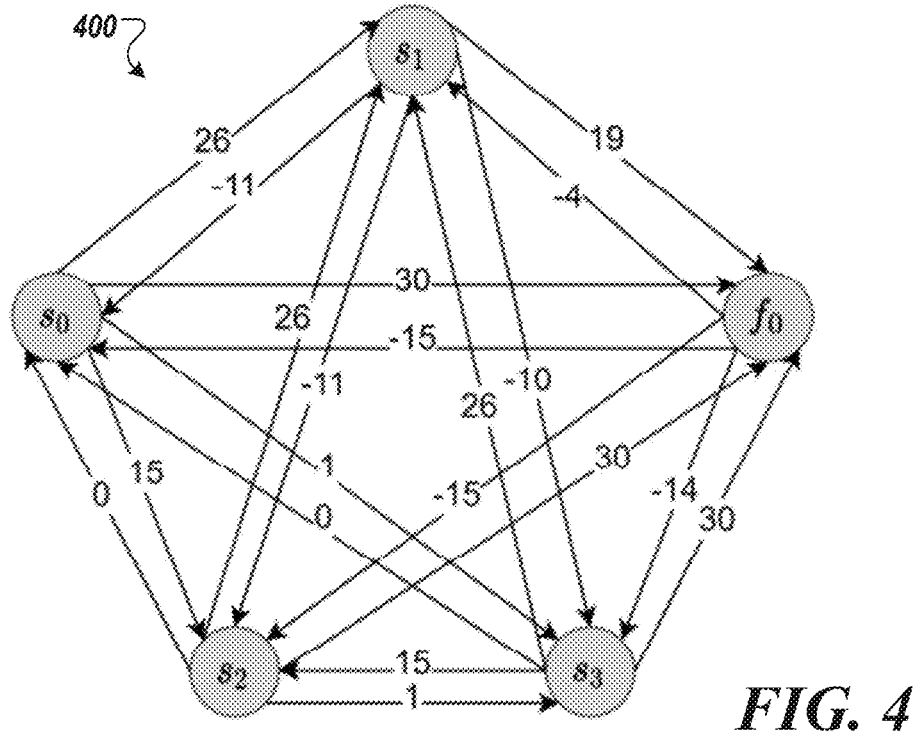
FIG. 4

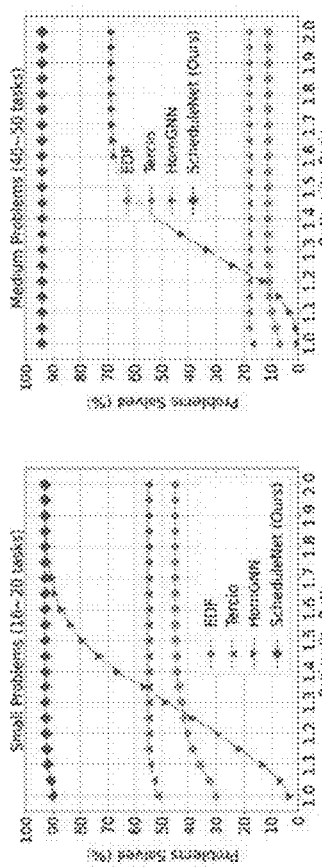
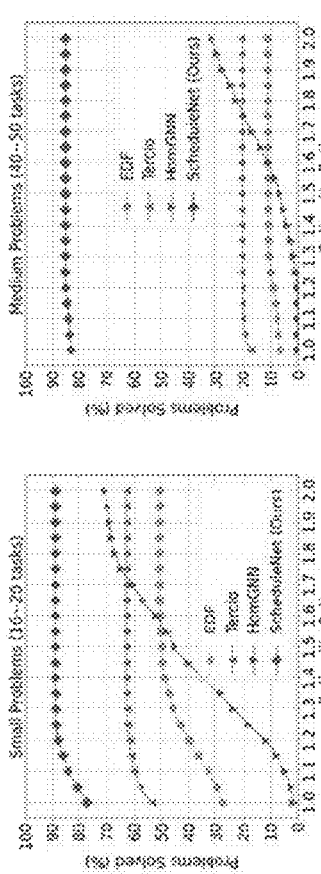
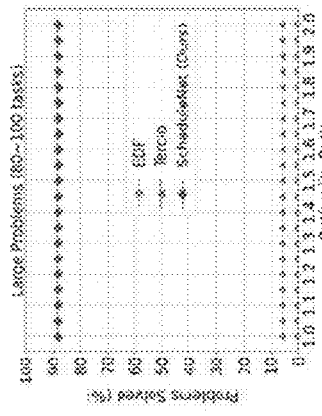
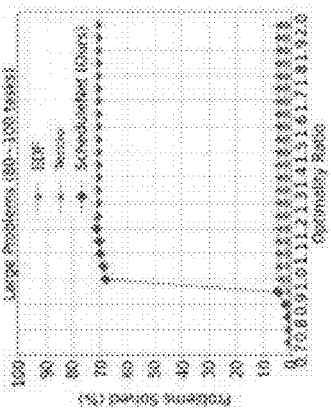
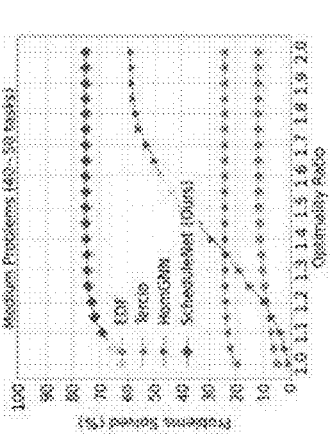
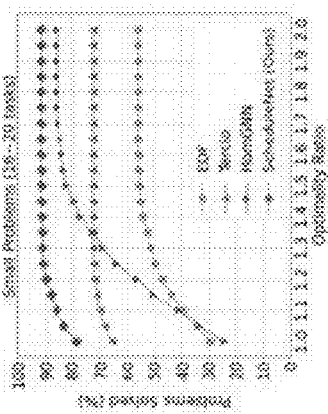
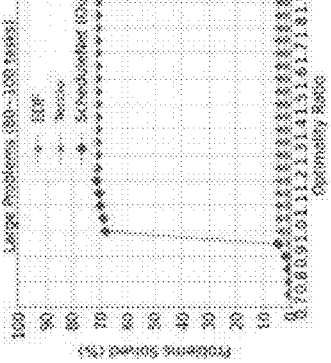
FIG. 7A FIG. 7B FIG. 7C FIG. 7D FIG. 7E FIG. 7F FIG. 7G FIG. 7H FIG. 7I

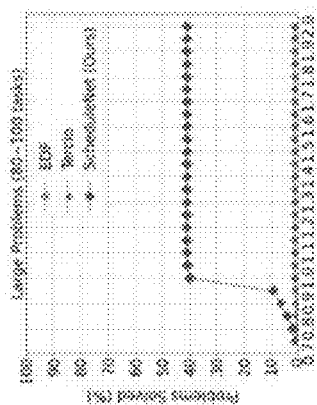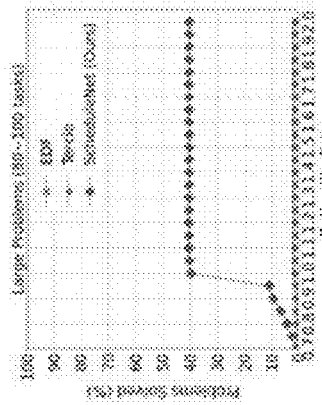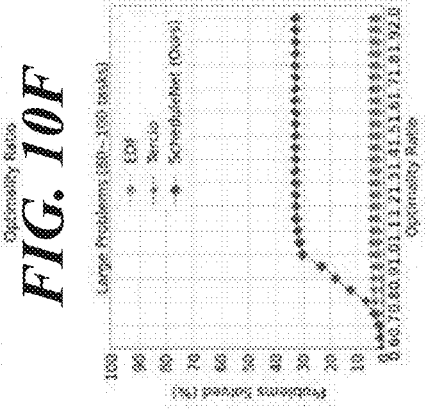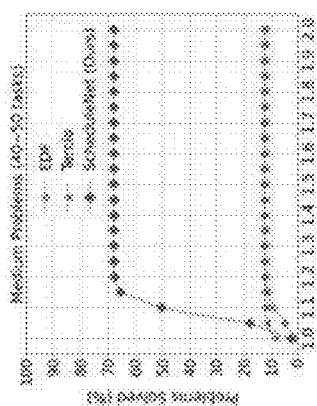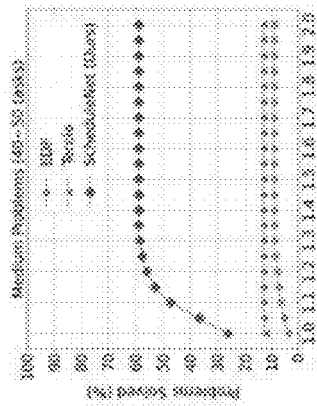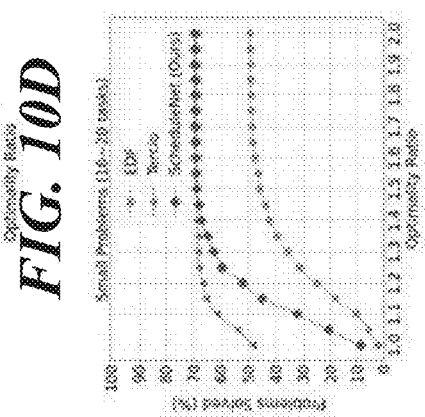
FIG. 10A FIG. 10B FIG. 10C FIG. 10D FIG. 10E FIG. 10F FIG. 10G FIG. 10H FIG. 10I

HETEROGENEOUS GRAPH ATTENTION NETWORKS FOR SCALABLE MULTI-ROBOT SCHEDULING

RELATED APPLICATIONS

This application claims priority to, and the benefit of, U.S. Provisional Patent Application No. 63/053,954, filed Jul. 20, 2020, entitled "LEARNING SCHEDULING POLICIES FOR MULTI-ROBOT COORDINATION WITH GRAPH ATTENTION NETWORKS," and U.S. Provisional Patent Application No. 63/053,958, filed Jul. 20, 2020, entitled "HETEROGENEOUS GRAPH ATTENTION NETWORKS FOR SCALABLE MULTI-ROBOT SCHEDULING WITH TEMPOROSPATIAL CONSTRAINTS," each of which is incorporated by reference herein in its entirety.

STATEMENT OF GOVERNMENT INTEREST

This invention was made with government support under N00014-19-1-2076 awarded by the Office of Naval Research. The government has certain rights in the invention.

BACKGROUND

Robot teams are increasingly being deployed in environments such as manufacturing facilities and warehouses to improve the speed of operation, save cost, and/or improve productivity. To efficiently coordinate multi-robot teams, fast, high-quality scheduling algorithms are essential to satisfy the temporal and spatial constraints imposed by the dynamic task specification and robot availability. Traditional scheduling solutions are based on exact methods, which are intractable for large-scale problems, or application-specific heuristics, which require expert domain knowledge to develop.

There is a benefit to make multi-robot scheduling more robust and scalable.

SUMMARY

An exemplary scheduler system and method are disclosed that can schedule a plurality of heterogenous robots to perform a set of tasks using heterogeneous graph attention network models (also referred to herein as "ScheduleNet"). The exemplary scheduler system and method can outperform other work in multi-robot scheduling both in terms of schedule optimality and the total number of feasible schedules found and also in a scalable framework that can be trained via imitation-based Q-learning operations. The exemplary scheduler system and method can autonomously learn scheduling policies on multiple application domains.

The term "robot", as well as the term "heterogeneous robot" as used herein, can refer to robotic equipment, manufacturing equipment, transport equipment, and/or people with assignable tasks in manufacturing, assembling, distributing environment, e.g., in a production line, assembly line, distribution line. Examples of such operation included, but are not limited to, aircraft assembly and/or manufacturing plant productions, automotive assembly and/or manufacturing plant productions, medical device assembly or manufacturing plant productions, semiconductor fabrication and/or assembly plant productions, consumer goods manufacturing and/or assembling plant productions, textile processing, paper manufacturing or printing, warehouses and distribution sites. In some embodiments, the exemplary scheduler system and method may be employed for a call center.

In an aspect, a method is disclosed to generate a schedule for a plurality of heterogenous robots (e.g., robotic equipment, manufacturing equipment, transport equipment, people with assigned tasks in manufacturing, assembling, distributing environment) performing a set of tasks using a scheduler executing instructions, wherein the plurality of heterogenous robots includes a first robot of a first type, and a second robot of a second type, wherein the first type and the second type are different (e.g., in being configured for different tasks or can perform the same tasks at different proficiencies).

The method includes at each of a plurality of scheduleable time steps, the scheduler collecting a list of available robots into a set of available robots; and the scheduler performing a plurality of simulations to iteratively select a robot from the set of available robots and attempting to assign one or more tasks to the robot using a Q-network (of states and action), wherein each simulated assignment comprises: building a heterogeneous graph g from states in a graph model (e.g., a simple temporal network (STN)-based model); generating input features for nodes in the heterogeneous graph; and predicting the Q-network using the heterogeneous graph; and selecting the robot using two or more policies selected from the group consisting of a first policy associated with first availability, a second policy associated with a minimum average time on unscheduled tasks, a third policy associated with a minimum time on any one unscheduled task, a fourth policy associated with a minimum average time on all tasks.

In some embodiments, the first policy associated with first availability comprises selecting a first robot in the set of available robots according to an index associated with the set of available robots; the second policy associated with the minimum average time on unscheduled tasks comprises (i) computing an average time for each of the set of available robots to complete an unscheduled task and (ii) selecting a given robot with a smallest average time from the computed average time; the third policy associated with the minimum time on any one unscheduled task comprises (i) computing a minimum time for each of the set of available robots to complete any one unscheduled task and (ii) selecting a given robot with a smallest minimum time from the computed minimum time; and wherein the fourth policy associated with the minimum average time on all tasks comprises (i) computing an average time for each of the set of available robots to complete all tasks (both scheduled and unscheduled) and (ii) selecting a given robot with the smallest average time from the computed average time.

In some embodiments, the graph model comprises a simple temporal network (STN)-based model that encodes temporal constraints and spatial constraints (e.g., 2D or 3D spatial constraints) into a heterogeneous graph.

In some embodiments, the graph model comprises a simple temporal network (STN)-based model that encodes temporal and/or spatial constraints and at least one constraint associated with available robots, robot locations, task locations, and shared resources (e.g., tools), into the heterogeneous graph in a convolutional manner.

In some embodiments, a Q-function of the Q-network in the heterogeneous graph is estimated based on state-action pairs.

In some embodiments, the heterogeneous graph comprises a plurality of nodes, each of the plurality of nodes, including a first node and second node, wherein the first node and the second node each comprise multi-tuple data (e.g., srcName; edgeName; dstName) that specify an edge type and relation that connects to each other.

In some embodiments, the heterogeneous graph is built by generating a first graph comprising a plurality of task nodes comprising a start time node and a finish time node; and generating a second graph as the heterogeneous graph by removing the finish time node.

In some embodiments, the heterogeneous graph is built by generating a base graph comprising a minimum distance graph; adding a plurality of robot nodes to the base graph, wherein each robot node of the plurality of robot nodes is connected to an assigned task node, and wherein each robot node of the plurality of robot nodes is connected to other robot nodes of the plurality of robot nodes; adding a plurality of location nodes to the base graph, wherein each location node of the plurality of location nodes is connected to an assigned task node, and wherein each location node of the plurality of location nodes is connected to other location nodes of the plurality of location nodes; and adding a plurality of state summary nodes to the base graph, wherein each state summary node of the plurality of state summary nodes is connected to a task node, a robot node, and a location node.

In some embodiments, the method further includes adding a plurality of Q-value nodes to the base graph, where each of the Q-value nodes of the plurality of Q-value odes is connected to a task node, a robot node, and a location node In some embodiments, the input features for the nodes comprise: a minimum expected time to complete an unscheduled task, a maximum expected time to complete the unscheduled task, a mean expected time to complete the unscheduled task, and a standard deviation of an expected time to complete the unscheduled task.

In some embodiments, the heterogeneous graph is generated in part using the Johnson algorithm or Floyd Warshall algorithm to generate a minimum distance graph as a structure for the heterogeneous graph.

In some embodiments, the method further includes training the Q-network using an imitation learning operation.

In some embodiments, the plurality of heterogenous robots comprise at least one of robotic equipment, manufacturing equipment, and transport equipment.

In some embodiments, the plurality of heterogenous robots comprise one or more human workers with assigned tasks in manufacturing, assembling, distributing workflow.

In another aspect, a scheduler system is disclosed comprising a processor, and a memory operatively coupled to the processor, the memory having instructions stored therein, wherein execution of the instructions by the processor cause the processor to generate a schedule for a plurality of heterogenous robots (e.g., robotic equipment, manufacturing equipment, transport equipment, people with assigned tasks in manufacturing, assembling, distributing environment) performing a set of tasks, wherein the plurality of heterogenous robots includes a first robot of a first type, and a second robot of a second type, wherein the first type and the second type are different (e.g., in being configured for different tasks or can perform the same tasks at different proficiencies).

The schedule is generated by, at each of a plurality of schedule-able time steps, the scheduler collecting a list of available robots into a set of available robots (e.g., rj); and the scheduler performing a plurality of simulations to iteratively select a robot from the set of available robots and attempting to assign one or more tasks to the robot using a Q-network (of states x, and action u), wherein each simulated assignment comprises: building a heterogeneous graph g from states (x) in a graph model (e.g., a simple temporal network (STN)-based model) generating input features for nodes in the heterogeneous graph (g); and selecting the robot using i) the heterogenous graph and ii) two or more policies selected from the group consisting of a first policy associated with first availability, a second policy associated with a minimum average time on unscheduled tasks, a third policy associated with a minimum time on any one unscheduled task, a fourth policy associated with a minimum average time on all tasks, wherein the generated schedule is used to direct or control the plurality of heterogenous robots to perform the set of tasks.

In some embodiments, the first policy associated with first availability comprises selecting a first robot in the set of available robots according to an index associated with the set of available robots; the second policy associated with the minimum average time on unscheduled tasks comprises (i) computing an average time for each of the set of available robots to complete an unscheduled task and (ii) selecting a given robot with a smallest average time from the computed average time; the third policy associated with the minimum time on any one unscheduled task comprises (i) computing a minimum time for each of the set of available robots to complete any one unscheduled task and (ii) selecting a given robot with a smallest minimum time from the computed minimum time; and the fourth policy associated with the minimum average time on all tasks comprises (i) computing an average time for each of the set of available robots to complete all tasks (both scheduled and unscheduled) and (ii) selecting a given robot with the smallest average time from the computed average time.

In some embodiments, the graph model comprises a simple temporal network (STN)-based model that encodes temporal constraints and at least one of available robots, robot locations, task locations, and shared resources (e.g., tools), into a heterogeneous graph in a convolutional manner and a Q-function of the Q-network is estimated based on state-action pairs.

In another aspect, a non-transitory computer-readable medium is disclosed having instructions stored thereon, wherein the instructions, when executed by a processor, cause the processor to generate a schedule for a plurality of heterogenous robots (e.g., robotic equipment, manufacturing equipment, transport equipment, people with assigned tasks in manufacturing, assembling, distributing environment) performing a set of tasks, wherein the plurality of heterogenous robots includes a first robot of a first type, and a second robot of a second type, wherein the first type and the second type are different (e.g., in being configured for different tasks or can perform the same tasks at different proficiencies).

The schedule is generated by, at each of a plurality of schedule-able time steps, the scheduler collecting a list of available robots into a set of available robots (e.g., rj); and the scheduler performing a plurality of simulations to iteratively select a robot from the set of available robots and attempting to assign one or more tasks to the robot using a Q-network (of states x, and action i), wherein each simulated assignment comprises: building a heterogeneous graph g from states (x) in a graph model (e.g., a simple temporal network (STN)-based model) generating input features for nodes in the heterogeneous graph (g); and selecting the robot using i) the heterogenous graph and ii) two or more policies selected from the group consisting of a first policy associated with first availability, a second policy associated with a minimum average time on unscheduled tasks, a third policy associated with a minimum time on any one unscheduled task, a fourth policy associated with a minimum average time on all tasks, wherein the generated schedule is used to direct or control the plurality of heterogenous robots to perform the set of tasks.

In some embodiments, the first policy associated with first availability comprises selecting a first robot in the set of available robots according to an index associated with the set of available robots; the second policy associated with the minimum average time on unscheduled tasks comprises (i) computing an average time for each of the set of available robots to complete an unscheduled task and (ii) selecting a given robot with a smallest average time from the computed average time; the third policy associated with the minimum time on any one unscheduled task comprises (i) computing a minimum time for each of the set of available robots to complete any one unscheduled task and (ii) selecting a given robot with a smallest minimum time from the computed minimum time; and the fourth policy associated with the minimum average time on all tasks comprises (i) computing an average time for each of the set of available robots to complete all tasks (both scheduled and unscheduled) and (ii) selecting a given robot with the smallest average time from the computed average time.

In some embodiments, the graph model comprises a simple temporal network (STN)-based model that encodes temporal constraints and at least one of available robots, robot locations, task locations, and shared resources (e.g., tools), into a heterogeneous graph in a convolutional manner and a Q-function of the Q-network is estimated based on state-action pairs.

BRIEF DESCRIPTION OF DRAWINGS

FIG. 2A shows an example algorithm that illustrates the process of generating schedules using ScheduleNet via the scheduling-through-simulation operation, in accordance with an illustrative embodiment.

FIG. 2B shows an example algorithm that illustrates the process of building a heterogeneous graph, in accordance with an illustrative embodiment.

FIG. 4 shows a method to generate the simplified or reduced simple temporal network (STN), in accordance with an illustrative embodiment.

FIGS. 7A-7I show evaluation results on problems of the two, five, and ten homogeneous robot teams, respectively, for a small problem, a medium problem, and a large problem.

FIGS. 10A-10I show the evaluation results of trained models on small, medium, and large problems and varying heterogeneous robot team configurations.

DETAILED SPECIFICATION

Traditionally, the problem of scheduling robots to complete tasks with temporal and spatial constraints has been approached either with exact algorithms, which are computationally intractable for large-scale, dynamic coordination, or approximate methods that require domain experts to craft heuristics for each application. We develop a novel graph attention network-based scheduler to automatically learn features of scheduling problems towards generating high-quality solutions, overcoming the limitations of these conventional methods. Experimental results showed that our network-based policy was able to find high-quality solutions for ~90% of the testing problems involving scheduling 2-5 robots and up to 100 tasks, which significantly outperforms the prior state-of-the-art, approximate methods. Those results were achieved with affordable computation cost and up to 100× less computation time compared to exact solvers.

The exemplary scheduler system and method can outperform prior work in multi-robot scheduling both in terms of schedule optimality and the total number of feasible schedules found. In addition, the exemplary scheduler system and method can achieve this superior performance in a flexible framework that allows us to train via imitation-based Q-learning on smaller problems to provide high-quality schedules on larger problems. In addition, the exemplary scheduler system and method can autonomously learn scalable scheduling heuristics on multiple application domains, attaining an order of magnitude speedup vs. an exact method.

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation. "[n]" corresponds to the nth reference in the reference list. For example. Ref. [1] refers to the $1^{st}$ reference in the list. All references cited and discussed in this specification are incorporated herein by reference in their entireties and to the same extent as if each reference was individually incorporated by reference.

Example System and Method of Operations

Figure 1:
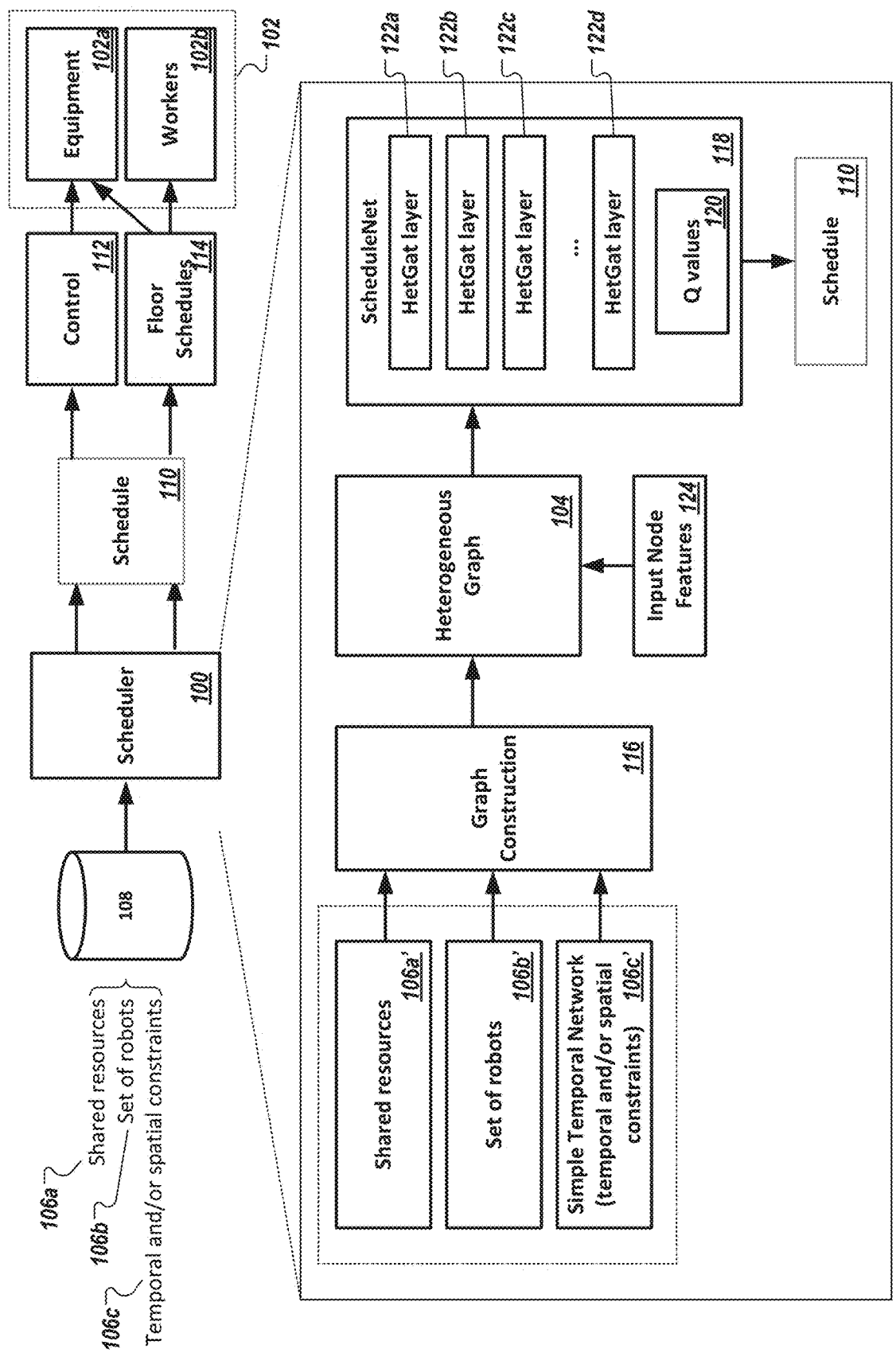
FIG. 1 shows a scheduler system configured to schedule a plurality of heterogeneous robots to perform a set of tasks using heterogeneous graph attention network models, in accordance with an illustrative embodiment.
Figure 3:
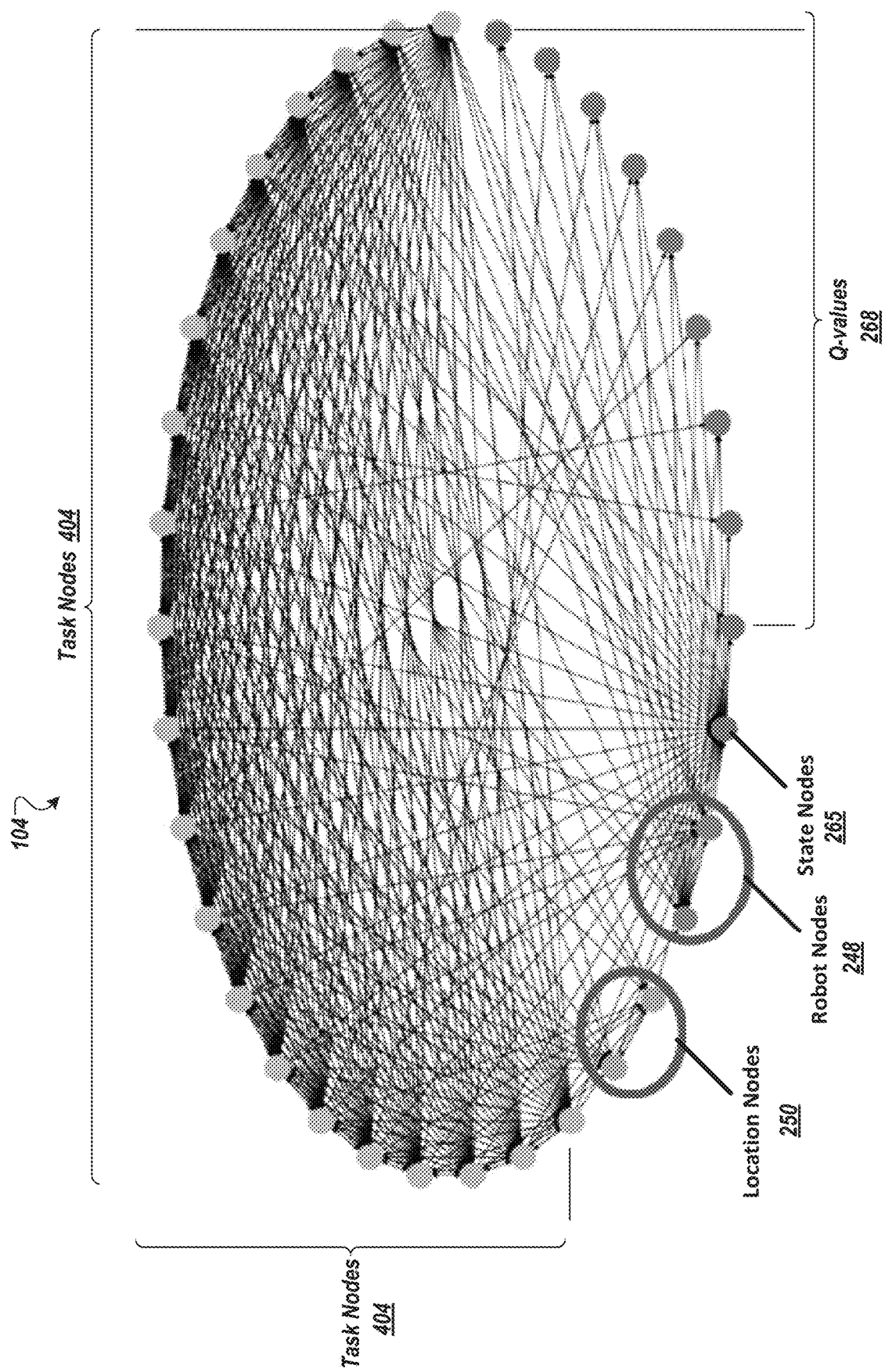
FIG. 3 shows an example heterogeneous graph generated according to FIG. 2B.

FIG. 1 shows a scheduler system 100 configured to schedule a plurality of heterogenous robots 102 to perform a set of tasks using heterogeneous graph attention network models 104 (not shown—see FIG. 3). The scheduler system 100 is configured to receive a set of data 106 (shown as "shared resources" 106a, "set of robots" 106b, and "temporal and/or spatial constraints" 106c) from a database or a user (108) to generate a schedule 110 to be used to direct or control the plurality of heterogenous robots 102 to perform the set of tasks.

In the example shown in FIG. 1, the heterogenous robots 102 can include equipment (shown as 102a) such as, but not limited to, robotic equipment, manufacturing equipment, transport equipment, as well as people with assignable tasks (shown as "workers" 102b) and other equipment and workers described herein. Schedule 110 is used as parameters in control systems (shown as 112) to control the operation of equipment 102a. Schedule 110 may also be used to generate floor schedules or plans (shown as 114) to direct the operation of the equipment 102a as well as workers 102b.

Schedule 110 includes a graph construction module 116 configured to generate the heterogeneous graph attention network models 104 from a set of input node features 124. In the example shown in FIG. 1, the graph construction module 116 employs a base graph model (e.g., a simple temporal network (STN)-based model) that is generated from temporal and/or spatial constraints 106c (shown as module 106c'). The STN-based model 106c' can extend the simple temporal network (STN) [4] that encodes the temporal constraints into a heterogeneous graph by adding nodes denoting various components, such as workers (human or robot) and physical locations or other shared resources.

Scheduler 110 includes a heterogeneous graph attention network 118 (also referred to as ScheduleNet 118) that receives the heterogeneous graph 104 to generate the schedule 110. The heterogeneous graphs 104 are used to build block layers of the ScheduleNet 118 shown as heterogeneous graph attention layers (HetGAT) 122. Any arbitrary depth may be generated through the stacking of this layer. While traditional graph neural networks (GNNs) can operate on homogeneous graphs to learn a universal feature update scheme for all nodes, Scheduler 100 casts the task scheduling problem in a heterogeneous graph structure and employs a heterogeneous graph attention network (ScheduleNet) that learns per-edge-type message passing and per-node-type feature reduction mechanisms on this graph. One advantage of ScheduleNet is that it can directly estimate the Q-value of state-action pairs as its output node feature.

In the example of FIG. 1, the heterogeneous graph attention network 118 includes a Q-network configured to generate predicted Q-values 120 using the plurality of heterogeneous graph attention layers 122 (shown as "HetGat layer" 122a, 122b, 122c, and 122d). ScheduleNet 118 can directly operate on the heterogeneous graph 104 in a fully convolutional manner with the heterogeneous graph 104 being encoded with the temporal and/or spatial constraints, the various components, such as workers (human or robot), and physical locations or other shared resources Schedule-Net 118 can employ the heterogeneous graph 104 to estimate the Q-function (in state-action pairs configurations) to be used for schedule generation.

ScheduleNet may be employed in an end-to-end training operation, e.g., via imitation learning, later discussed herein, and can be generalized to large, unseen problems with an affordable increase in computation cost. This flexibility allows the instant scheduler to set a new state-of-the-art for multi-robot coordination and autonomously learning domain-specific heuristics for robotic applications.

Markov Decision Process (MDP) Formulation. The scheduler may employ learning of greedy heuristics to construct solutions by appending tasks to an individual robot's partial schedule based on the maximization of a score Q-function approximated with a neural network parameterized by θ. The schedule may be constructed as a Markov decision process (MDP) using a five-tuple $<x_t, u, T, R, \gamma>$ that includes: states $x_t$, actions u, transitions T, reward R, and discount factor $\gamma$.

State $x_t$ at a decision-step t includes the temporal constraints of the problem, represented by an STN, the location information, and all robots' partial schedules constructed so far. Action $u=<\tau_i,r_j>$ corresponds to appending unscheduled task $\tau_{i\ at\ the\ end\ of\ the}$ partial schedule of robot $r_j$. Transitions T correspond to deterministically adding the edges associated with the action into the STN and updating the partial schedule of the selected robot. Reward R of a state-action pair is defined as the change in objective values after taking the action, calculated as $R=-1\times(Z_{t+1}-Z_t)$. $Z_t$ denotes the partial objective function at state $x_t$ and is calculated only using scheduled tasks. For example, while minimizing makespan, $Z_t=\max_i f_i \tau_i \in\{partial\ schedules\}$. The reward can be multiplied by -1.0 as the objective is minimization. The scheduler 100 can further divide $Z_t$ by a factor D>1 if $x_t$ is not a termination state. D is used to balance between finding the highest immediate reward (local optimal) and finding the global optimal schedules. If the action results in an infeasible schedule in the next state, a large negative reward $M_{inf}$ is assigned to $Z_{t+1}$.

Example Method to Generate a Schedule Using Heterogenous Graphs

Schedule Generation. FIG. 2A shows Algorithm 1 (200) that illustrates the process of generating schedules using ScheduleNet via scheduling-through-simulation operation. As shown in FIG. 2A, the input (202) of Algorithm 1 (200) include the five-tuple $<x_t, u, T, R, \gamma>$, which is used to generate the output schedule 110 (shown as 110').

The learned heuristic may rely on the evaluation function Q(x, u) (in module 120), which may be learned using a collection of problem instances to estimate the total discounted future reward of state-action pairs and select accordingly. The scheduler 100 may use scheduling-through-simulation to generate the schedules 110. It has been shown in [27] that this process achieves better performance than using decision-step-based generation.

In scheduling-through-simulation. Algorithm 1 is shown starting (204) from t=0 in which t refers to time points instead of decision steps. At each time step, the scheduler 100 first collects (206) all the available robots not working on a task into a set referred to as $r_{avail}$ in which $r_{avail}=\{r_j | r_j$ is available$\}$. Then, the scheduler 100 picks (208) a robot (denoted as pickRobot function) from $r_{avail}$ and tries to assign (210) $\tau:=\arg\max_{\tau\in\tau_{avail}} Q_\theta(x, u)$ (212), where $\tau_{avail}$ is the set of unscheduled tasks and only Q values associated with $r_j$ are considered. As shown in Algorithm 1, the scheduler 100 build (214) a heterogeneous graph g from states in a graph model, generate (216) input features for nodes in the heterogeneous graph, and predict (218) the Q-network using the heterogeneous graph. The operations 214, 216, 218 are later described herein.

This task allocation step (210) repeats until no robot is available; then, the simulation moves to the next time step, t+1 (220). When considering a team of homogeneous robots, pickRobot function (208) can dynamically pick heterogeneous robots from $r_{avail}$ in accordance with a number of policies as provided in Table 1.

TABLE 1

| Policy | Description |
| --- | --- |
| First available | Pick the first robot in $r_{avail}$ according to their original index |
| Minimum average time on unscheduled tasks | Compute the average time it takes for each robot in $r_{avail}$ to complete unscheduled tasks and pick the robot with the shortest of such time. |
| Minimum time on any one unscheduled task | Find the minimum time it takes for each robot in $r_{avail}$ to complete any one unscheduled task, and pick the robot with the shortest of such time. |
| Minimum average time on all tasks | Compute the average time it takes for each robot in $r_{avail}$ to complete all tasks, both scheduled and unscheduled, and pick the robot with the shortest of such time. |

When solving a given problem instance, ScheduleNet can execute in parallel each task allocation policy variant for the pickRobot function. Among the feasible policy selectable by the same model with each of the evaluated policies, the one that yields the best objective function score are kept. The ensemble of different robot-picking policy variants proves to find not only more feasible schedules but also schedules with better makespans than any single policy alone, as each policy may work better than another in certain simulated scenarios but not the others.

Heterogeneous Graph Network FIG. 2B shows Algorithm 2 (218') that illustrates the process of building (218) a heterogeneous graph 104. FIG. 3 shows an example heterogeneous graph 104 that is generated according to FIG. 2B.

The input (240) of Algorithm 2 (218') includes a simple temporal network (STN), location loc, robot r and their partial schedules, and available action $u_{avail}$. Algorithm 2 (218') uses the input (240) to construct a heterogenous graph representation as the output 242.

Heterogenous graph 104 may be constructed from a base graph such as a simple temporal (STN) network. STN has been used for the scheduling of homogenous robots. The temporal constraints in multi-robot task allocation and scheduling problems have been modeled as STNs, which can provide consistent upper and lower bound constraints that can be efficiently verified in polynomial time [21]. STNs also allow for encoding set-bounded uncertainty.

To accommodate multiple agents, physical constraints, etc. were employed in STNs to address latent disjunctive variables that are augmented into the graph to account for the agents being able to perform only one task at a time and for only one robot occupying a work location at a time, which is known as the Disjunctive Temporal Problem [22].

Heterogeneous graph 104 can specify the edge (shown as lines connecting nodes) uses three-tuple description having the form <srcName, edgeName, dstName>. Put another way, the edge type/relation specifies and connects two node types (from the source node to the destination node), which can also be denoted as $$(srcName) \xrightarrow{edgeName} (distName).$$

In addition, Heterogenous graph 104 may employ a simplified or reduced STN 400 (not shown—see FIG. 4). FIG. 4 shows a method to generate the simplified or reduced STN 400. STN 402 shows an example input STN in which each task. $\tau_i$, is first be represented by two event nodes: a start time node, $s_i$, and a finish time node, $f_i$. The directed, weighted edges can encode the temporal constraints associating corresponding nodes.

Because the task duration can be deterministic, the scheduler 100 can simplify the STN to reduce the model complexity. That is, after running (244) (see FIG. 2B) the Johnson's algorithm (Johnson 1977) or the Floyd Warshall's algorithm [6] on the input STN to find its minimum distance graph, the scheduler can remove (246) all finish time nodes (except $f_0$) from the distance graph to obtain a new STN. The simplified STN 400 (or reduced STN) (see FIG. 4), thus include only half the nodes of the input STN (402) while still preserving all the necessary temporal constraints. In this way, each task can be represented by its start time node with task duration now serving as its node feature.

In the example shown in FIG. 4, a process is shown for an example problem with 3 tasks (404). Tasks "1," "2" and "3" (shown as 404a, 404b, and 404c) with durations "4," "8," and "7." respectively (shown as 406a, 406b, 406c). Table 408 shows the shortest distances from each source (src) node to each destination (dst) node. In this example, Task "3" has a deadline constraint: $f_3 \leq 8$. There is a wait constraint between task 1 and task 2: $s_1 \geq f_2 + 3$. Distances in the blue cells of FIG. 2b are used to construct the graph in FIG. 2c. The representation shown in table 408 effectively describes the temporal constraint representation in the input STN 402 for the purposes of performing an all-pairs shortest path computation as input to the GNN model. The task durations represented by edges in the input STN 402 are preserved implicitly in the graph edges shown in the reduced STN 400 and are captured by the GNN as node features for the corresponding tasks.

Given the partial schedule at the current state, the initial input features of each task node are generated by: the first two dimensions are the one-hot encoding of whether a task has been scheduled [1 0] or not [0 1]; the next dimension is the task duration. The edge type from STNs can be denoted using $$(task) \xrightarrow{temporal} (task)$$

as they encode the temporal constraints.

Heterogenous graph 104 can include an extension to the simplified STN by adding robot and location nodes (shown as 248 and 250, respectively). Robot and location nodes can be added (shown as 252 and 254, respectively), equaling the number of different robots and locations in the problem, respectively. A robot node is connected (256) to the task nodes that have been assigned to it, with edge relation $$(task) \xrightarrow{assignedTo} (robot).$$

All robots are connected (258) with each other to enable message flow between them, with edge relation $$(robot) \xrightarrow{communicate} (robot).$$

The initial feature of a robot node is the number of tasks assigned so far. In a similar manner, a location node is connected (260) to the tasks nodes in that location, with edge relation (task) —locatedin→ (location).

All location nodes ae connected (262) with each other, with the relation (location) —near→ (location).

The initial feature of a location node is the number of tasks in that location.

As the Q-function is based on state-action pairs, it is expected the network would learn a state embedding of the problem from all the task, robot, and location node embeddings. To achieve this, the scheduler adds (264) a state summary node (265) into the graph structure. The state summary node is connected to all the task robot, and location nodes, with edge types (task) —in→ (state), (robot) —in→ (state), (location) —in→ (state), respectively. The initial features of the graph summary node include the number of total tasks, the number of currently scheduled tasks, the number of robots, and the number of locations.

Once the node embeddings are computed using the heterogeneous graph 104, it is possible to learn a separate Q network consisting of several fully connected (FC) layers to predict the Q-value of a state-action pair, taking as input the concatenation of embeddings from the corresponding state, task, and robot nodes. However, designing a separate Q network on top of GNNs is computationally expensive and not memory efficient, especially when evaluating a large number of state-action pairs at once for parallel computing. Instead, the scheduler is configured to add (266) value nodes (268) (also referred to as "Q-value nodes" 268) in the graph to directly estimate the Q-values. A value node is connected to corresponding nodes with edge types denoted as (task) —to→ (value), (state) —to→ (value),
(state) —to→ (value)

Figure 5A:
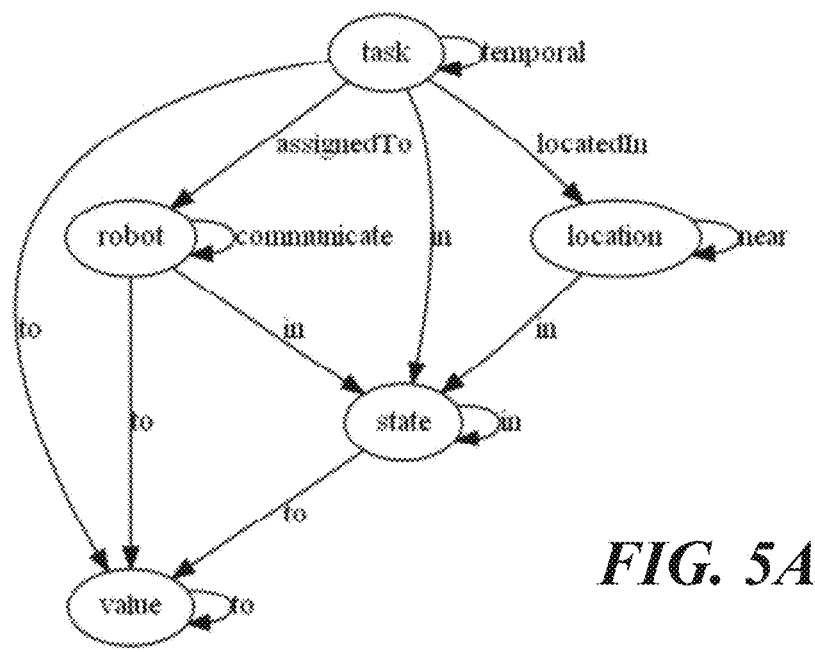
FIG. 5A shows a Meta-graph of the heterogeneous graph built from the STN by adding robot, location, state, and value nodes.

(shown as 270, 272, 274, respectively). The initial feature of a value node is set to 0. During the evaluation, the heterogeneous graph 104 is constructed with the needed Q-value nodes covering task nodes in $\tau_{avail}$ and robot node of $r_j$ as discussed in relation to FIG. 2A. As the minimum distance graph of an STN is calculated while the heterogeneous graph 104 is being constructed, the scheduler can further filter out the tasks in $\tau_{avail}$ of which the lower bound of task start time is greater than the current time. For all nodes, self-loops are added so that their own features from previous layers are considered for the next layer's computation. The metagraph (or network schema) of the graph constructed with Algorithm 2 is shown in FIG. 5A, which summarizes all the node types and edge types. FIG. 5A shows a Meta-graph of the heterogeneous graph built from the STN by adding robot, location, state, and value nodes.

Extension for Heterogeneous Task Completion. Heterogeneous graph 104 may further extend the Meta-graph of FIG. 5A to include the duration of a task to address unscheduled tasks. In a setting of heterogeneous robot teams, the duration of a task can depend on the robot which is assigned to the task. The scheduler can address problems/scenarios of a partial schedule in which some tasks have already been assigned an agent and then sequenced. For those tasks, their durations are known, which is given by the assigned robot (i.e., $dur_{i,r}$ for task $\tau_i$ assigned robot r). However, the duration of unscheduled tasks is yet to be determined, as no robot has been assigned. As such, Eq. 20 (below) can only be described with a relaxed set bound as shown in Equation 1. Here $dur_{i,min}$, $dur_{i,max}$ are the minimum and maximum amounts of time task $\tau_i$ can be finished. Specifically, $$dur_{i,min} = \min_r dur_{i,r} \text{ and } dur_{i,max} = \qquad (Eq. 1)$$
$$\max_r dur_{i,r} \cdot dur_{i,min} \le f_i - s_i \le dur_{i,max}, \forall \tau_i \in \{unscheduled\}$$

Unfortunately, this set bound can nullify the simplification operation for reducing the graphs and increase complexity. The simplification operation can be adjusted for this more expressive setting by extending the set of task node features to include multiple descriptive statistics describing the task's possible completion times among all robots where the size is non-parametric in the number of robots. Specifically, the input features of task $\tau_i$ can be extended to include the minimum, the maximum, the mean, and the standard deviation of $\{dur_{i,r}, \forall_r \in r\}$. This modeling approach achieves a potent balance between model complexity and expressivity.

Additionally, information about completion times can be encoded for unscheduled tasks by augmenting the heterogeneous graph obtained from Algorithm 2. Two new edge types may be added between nodes of unscheduled tasks and robot nodes:

(task) —takeTime→ (robot)

(502) (see FIG. 5B) and (robot) —useTime→ (task)

(504). The edge attribute encodes the time used for a robot to complete the task connected via this edge.

A further change to Algorithm 2 concerns the handling of edges between location nodes. Because locations are expanded to 2D spatial areas in the heterogeneous robot case, only locations that fall within the minimum allowed safety distance to represent the proximity constraints are connected instead of connecting location nodes with each other.

Figure 5B:
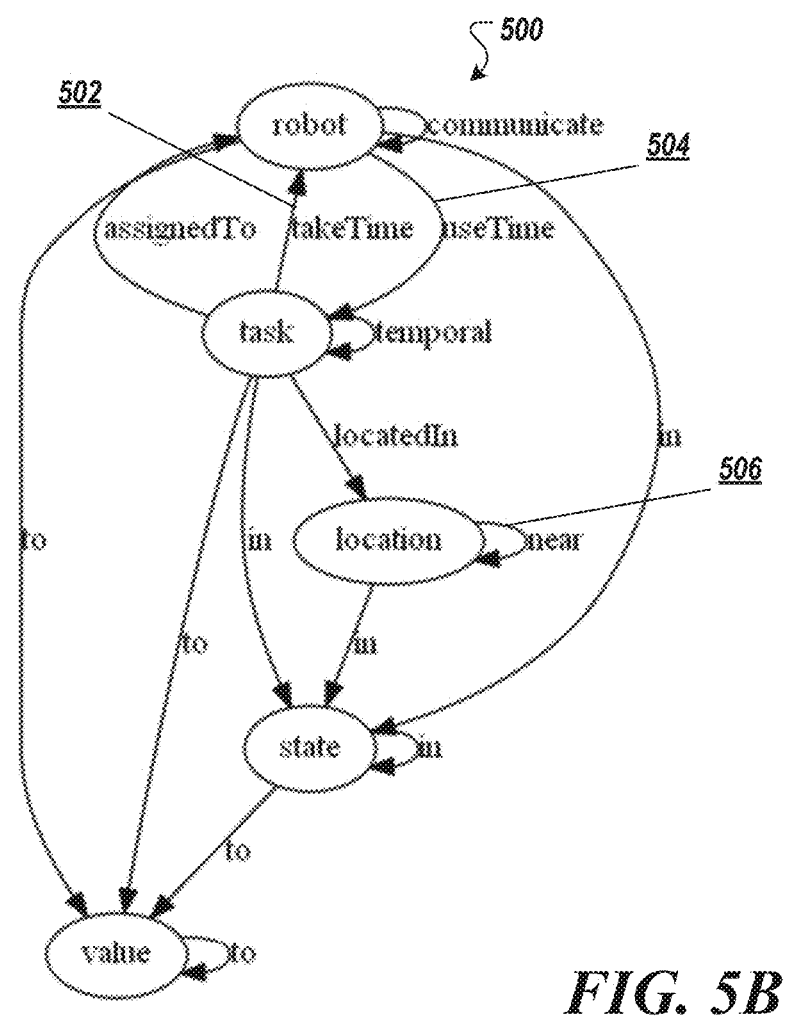
FIG. 5B shows the augmented metagraph with heterogeneous robot teams, including the newly-added edge types between robot nodes and task nodes.

FIG. 5B shows the augmented metagraph 500 with heterogeneous robot teams, including the newly-added edge types (502, 504) between robot nodes and task nodes. The edge type (location) —near→ (location)

(506), although it shares the same name as in FIG. 5A, now encodes the 2D proximity constraints.

Heterogeneous Graph Attention Layer. The feature update process in a HetGAT layer 122 may be conducted in two steps: per-edge-type message passing followed by per-node-type feature reduction. During message passing, each edge type uses a distinct weight matrix, $W_{edgeName} \in \mathbb{R}^{D \times S}$, to process the input feature from the source $N_{src}$, and sends the computation results to the destination node, $N_{dst}$'s mailbox. S is the input feature dimension of the source node $N_{src}$, and D is the output feature dimension of the destination node $N_{dst}$. In the case that several edge types share the same name, the scheduler uses $W_{srcName,edgeName}$ to distinguish between them. For example, edge types coming into the state nodes may be distinguished by temporal $W_{task,in}$, $W_{robot,in}$, and $W_{state,in}$. As for edge type

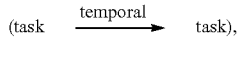

which is the only weighted edge in our heterogeneous graph formulation, the edge attribute, w, is also sent after being transformed by WtempEdge$\in \mathbb{R}^{D \times 1}$.

Feature reduction may happen inside each node's mailbox. For each edge type that a node has, the HetGAT layer (e.g., 122) can compute per-edge-type aggregation results by weighing received messages stored in its mailbox, along with the same edge type with normalized attention coefficients that are feature-dependent and structure-free. Those results can then be merged to compute the destination node's output feature. In the case of coordinating teams of homogeneous robots, task-type nodes only ever serve as destination nodes for other task nodes. Task nodes can serve as source nodes for non-task type nodes (e.g., robot nodes). This flow of information from task nodes to robot nodes enables the scheduler to extract embeddings for each robot. Embeddings for tasks are extracted from the underlying STN, which already captures information regarding the robots' homogeneous task completion times. When the model is augmented (as previously described) to account for heterogeneous task completion times, edges from non-task type nodes (e.g., robot nodes) to task nodes may be considered to extract task embeddings that account for robot heterogeneity.

The feature update formulas of different node types are listed in Eqs. 2-6.

Task $h'_i = \sigma\left(\sum_{j \in N_{temporal}(i)} a_{ij}^{temporal}(W_{temporal}h_j + W_{tempEdge}edge_{ji})\right)$ (Eq. 2)

Robot $h'_i = \sigma\left(\sum_{j \in N_{assignedTo}(i)} \alpha_{ij}^{assignedTo} W_{assignedTo} h_j + \sum_{k \in N_{comm.}(i)} \alpha_{ik}^{comm.} W_{comm.} h_k\right)$ (Eq. 3)

Location $h'_i =$ (Eq. 4)
$\sigma\left(\sum_{j \in N_{locatedIn}(i)} \alpha_{ij}^{locatedIn} W_{locatedIn} h_j + \sum_{k \in N_{near}(i)} \alpha_{ik}^{near.} W_{near} h_k\right)$ State $h'_i =$ (Eq. 5)
$\sigma\left(\sum_{j \in N_{task,in}(i)} \alpha_{ij}^{task,in} W_{task,in} h_j + \sum_{k \in N_{robot,in}(i)} \alpha_{ik}^{robot,in} W_{robot,in} h_k + \sum_{m \in N_{loc,in}} \alpha_{im}^{loc,in} W_{loc,in} h_m + W_{state,in} h_i\right)$ Value $h'_q = \sigma(W_{task,to} h_t + W_{robot,to} h_r + W_{state,to} h_s + W_{value,to} h_q)$ (Eq. 6)

In Eqs. 2-6, $N_{edgeName}(i)$ is the set of incoming neighbors of node i along with a certain edge type, and $\sigma()$ represents the ReLU nonlinearity. Prior work has shown that attention mechanisms are beneficial for representation learning on homogeneous graphs (Velickovic et al., 2017; Kool et al., 2019). Thus, the attention models are extended from prior work to reason about task scheduling with heterogeneous graph networks. Specifically, The per-edge-type attention coefficient, $\alpha_{ij}^{edgeName}$, is calculated based on source node features and destination node features (plus edge attributes if applicable).

More specifically, the attention coefficient for edge type

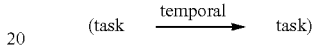

is calculated by Eq. 7, where $\vec{\alpha}_{temporal}^T$ is the learnable weights, the symbol $\|$ is the concatenation operation, and $\sigma'($ ) is the LeakyReLU nonlinearity (with a negative input slope of 0.2). Softmax function is used to normalize the coefficients across all choices of j.

$\alpha_{ij}^{temp.} = \text{softmax}_j(\sigma'(\vec{\alpha}_{temp.}^T[W_{temp.} \vec{h}_i \| W_{temp.}$
$\vec{h}_j \| W_{tempEdge} w_{ji}]))$ (Eq. 7)

The attention coefficients for other edge types are calculated by Eq. 8. $W_{dstType}$ is chosen depending on the destination node type. We use $W_{comm.}$ for robot nodes, $W_{near}$ for location nodes, and $W_{state,in}$ for the state node.

$\alpha_{ij}^{edgeName.} = \text{softmax}_j(\sigma'(\vec{\alpha}_{edgeName}^T[W_{edgeName}$
$\vec{h}_i \| W_{dstType} \vec{h}_j]))$ (Eq. 8)

For edge types connecting the same type of nodes, the attention coefficients can be computed by Eq. 9.

$\alpha_{ij}^{edgeName.} = \text{softmax}_j(\sigma'(\vec{\alpha}_{edgeName}^T[W_{edgeName}$
$\vec{h}_i \| W_{edgeName} \vec{h}_j]))$ (Eq. 9)

However, Equation 9 does not hold for edges where the source node, $h_j$, and destination node, $h_i$, are of different node types. Take the edge type

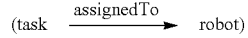

as an example, the message passing weights, $W_{assignedTo}$, are only defined and trained for processing the source node type features (of task nodes) and are thus not adequate for processing the destination node type features (of robot nodes) for attention computation. Therefore, Equation 17 can be changed into Equation 18 by using both $W_{edgeName}$ and $W_{dstType}$ to account for differing types of source and edge nodes. While these additional parameters improve model expressivity, there is a cost in terms of computational memory and speed.

In practice, a helpful trade-off can be achieved between expressivity and computational costs by employing weight sharing. Specifically, $W_{dstType}$ can be set to be equal to $W_{comm}$, $W_{near}$, and $W_{state,in}$ when the destination node type includes robot, location, and state node, respectively as shown in Eq. 10.

$$\alpha_{ij}^{edgeName} = \text{softmax}_j(\sigma'(\vec{\alpha}_{edgeName}^T[W_{dstType}$$
$$\vec{h}_i\|W_{edgeName}\vec{h}_j)) \quad \text{(Eq. 10)}$$

To stabilize the learning process, the scheduler 100 may utilize the multi-head attention proposed from [23], adapting it to fit the heterogeneous case. The scheduler uses K independent HetGAT layers (e.g., 122) to compute node features in parallel and then merge the results as the multi-head output for each multi-head layer in ScheduleNet. e.g., by concatenation, except for the last layer, which employs by averaging. Considering that ScheduleNet utilizes a fully convolutional structure where the last graph layer directly predicts Q-values as the 1-dimensional output feature of value nodes, merging multi-head results with concatenation can be no longer viable for the last layer as it would give a K-dimensional output.

Extension for Heterogeneous Task Completion. Because the newly-added edge type $$(\text{robot}) \xrightarrow{useTime} (\text{task})$$

only accounts for unscheduled tasks. The feature update formula for scheduled tasks remains the same as Eq. 3. For unscheduled tasks, Eq. 3 is changed by including terms a counting for the message coming through the new edge type, as shown in Eq. 11.

$$h_i' = \sigma\Bigg(\sum_{j \in N_{temporal}(i)} \alpha_{ij}^{temporal}(W_{temporal}h_j + W_{tempEdge}edge_{ji}) + \quad \text{(Eq. 11)}$$
$$\sum_{k \in N_{useTime}(i)} \alpha_{ik}^{useTime} W_{useTime}h_k + W_{useTimeEdge}edge_{ki}'\Bigg)$$

In Eq. 11, $edge_{ki}'$ is the attribute of the new edge, and the corresponding attention coefficient, $a_{ik}^{useTime}$ is computed by Eq. 12.

$$\alpha_{ik}^{useTime} = \text{softmax}_k(\sigma'(\vec{\alpha}_{useTime}^T[W_{temp.}\vec{h}_i\|W_{useTime}$$
$$\vec{h}_k\|W_{useTimeEdge}edge_{ki}'])) \quad \text{(Eq. 12)}$$

Similarly, the addition of new edge type $$(\text{task}) \xrightarrow{takeTime} (\text{robot})$$

changes the feature update equation of robot nodes from Eq. 4 in the homogeneous case to Eq. 13 in the heterogeneous case.

$$h_i' = \sigma\Bigg(\sum_{j \in N_{assignedTo}(i)} \alpha_{ij}^{assignedTo} W_{assignedTo}h_j + \quad \text{(Eq. 13)}$$
$$\sum_{j \in N_{comm.}(i)} \alpha_{ik}^{comm.} W_{comm.}h_k +$$
$$\sum_{j \in N_{takeTime}(i)} \alpha_{ik}^{takeTime} W_{takeTime}h_m + W_{takeEdge}edge_{mi}''\Bigg)$$

In Eq. 13, $edge_{mi}'$ is the attribute of the corresponding edge, and the corresponding attention coefficient $\alpha_{im}^{takeTime}$ is computed according to Eq. 14.

$$\alpha_{im}^{useTime} = \text{softmax}_m(\sigma'(\vec{\alpha}_{takeTime}^T[W_{comm.}$$
$$\vec{h}_i\|W_{takkeTime}\vec{h}_m\|W_{takeTimeEdge}edge_{mi}''])) \quad \text{(Eq. 14)}$$

Even though locations are extended from 1 D to 2D areas. Eq. 5 still applies to location nodes. Because now $N_{near}(i)$ only considers neighbor locations falling within the allowed safety distance instead of all locations, and $W_{near}$, $\alpha_{ik}^{near}$ would learn to encode the corresponding proximity constraints. Finally, the update equations for state and value nodes (Eqs. 6 and 7) remain the same as in the homogeneous robot case.

Imitation Learning

Under the MDP formulation, the scheduler is configured to learn a greedy policy for sequential decision making. Thus, it is natural to consider reinforcement learning algorithms (e.g., Q-learning) for training ScheduleNet. However, reinforcement learning relies on finding feasible schedules to learn useful knowledge. In the instant problems, most permutations of the schedule are infeasible. As a result, reinforcement learning spends much more time than allowed before learning anything of value exploring infeasible solutions.

Instead, the instant scheduler leverages imitation learning methods that learn from high-quality schedules to accelerate the learning process for quick deployment. In real-world scheduling environments, high-quality, manually-generated schedules from human experts who currently manage the logistics in manufacturing environments may be available. Moreover, it is practical to solve small-scale problems optimally with exact methods.

Given the scalability of the heterogeneous graph, it is expected that exploiting such expert data on smaller problems to train the ScheduleNet can generalize well towards solving unseen problems, even in a larger scale.

Let $D_{ex}$ denote the expert dataset that contains all the state-action pairs of schedules either from exact solution methods or the domain experts. For each transition, the total reward is calculated from current step t until termination step n using $R_t^{(n)} = \sum_{k=0}^{n-t}\gamma^k R_{t+k}$ and regress the corresponding Q-value from ScheduleNet towards this value as shown in Eq. 15, where the supervised learning loss, $L_{ex}$, is computed as the mean squared error between $R_t^{(n)}$ and our current estimate of the expert action $u_{ex}$.

$$L_{ex} = \|\hat{Q}_\Theta(h_x, h_{u,ex}) - R_t^{(n)}\|^2 \quad \text{(Eq. 15)}$$

To fully exploit the expert data, the scheduler grounds the Q values of alternative actions $u_{alt}$ (not selected by the expert) to a value below $R_t^{(n)}$ using the loss shown in Eq. 16, where $q_o$ is a positive constant empirically picked as an offset, and $N_{alt}$ is the number of alternate actions at step t. In accordance with the schedule generation scheme, $N_{alt}$ only considers actions involving the same robot selected by the expert.

$$L_{alt} = \frac{\sum \left\|Q(x, u_{alt}) - \min\left(\begin{bmatrix} Q(x, u_{alt}) \\ R_t^{(n)} - q_0 \end{bmatrix}\right)\right\|^2}{N_{alt}} \quad \text{(Eq. 16)}$$

The min term in Eq. 16 ensures that the gradient propagates through all the unselected actions that have Q values higher than $R_t^{(n)} - q_o$. The difference from [17] lies in that they only train on the unselected action with the max Q value.

The total supervised loss is shown in Eq. 17, where L2 is the L2 regularization term on the network weights, and $\lambda_1$, $\lambda_2$ are weighting parameters assigned to different loss terms empirically.

$$L_{total} = L_{ex} + \lambda_1 L_{alt} + \lambda_2 L_2 \quad \text{(Eq. 17)}$$

Figure 6:
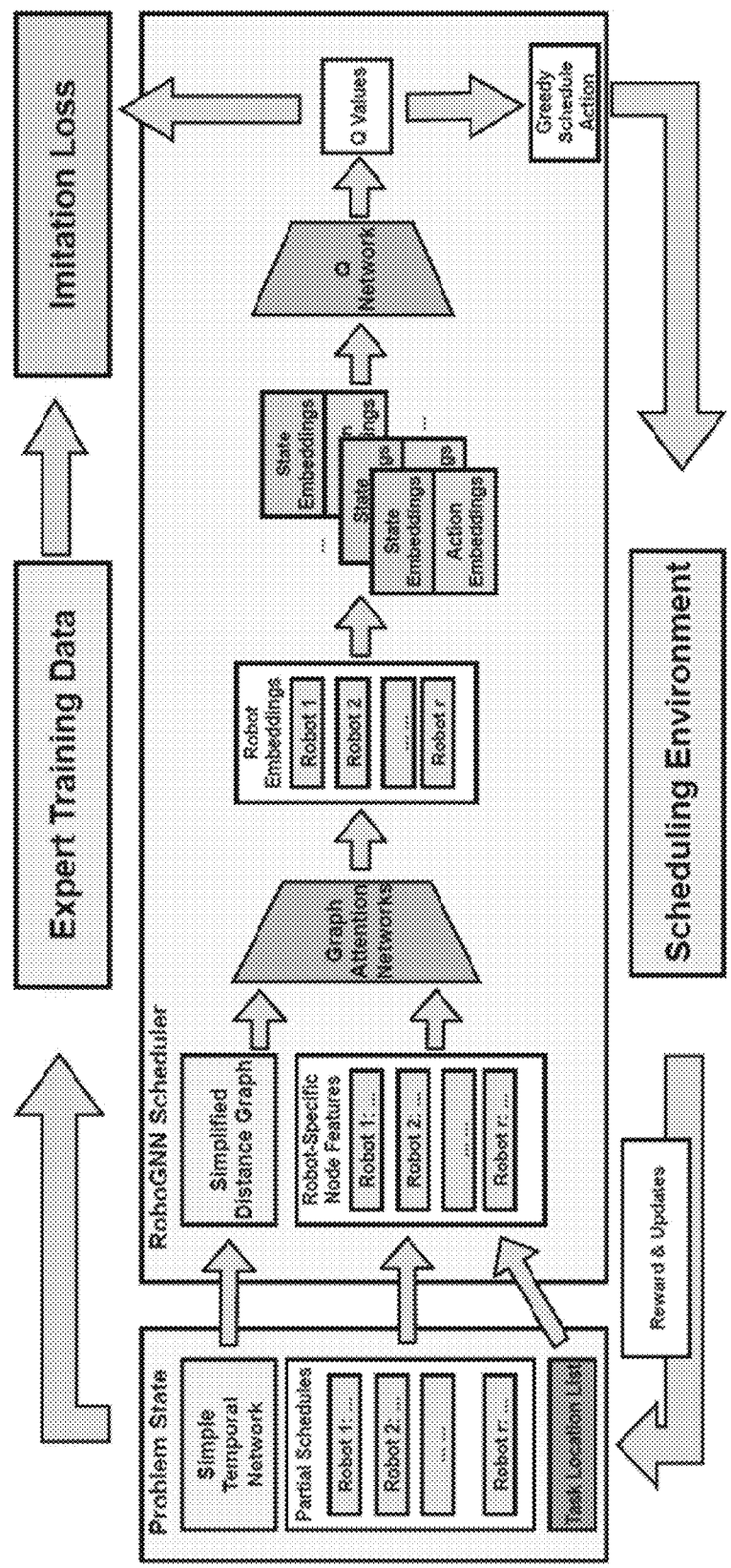
FIG. 6 shows a scheduler development framework that includes graph attention networks and imitation learning for multi-robot scheduling, in accordance with an illustrative embodiment.

FIG. 6 shows a scheduler development framework that includes graph attention networks and imitation learning for multi-robot scheduling. The scheduler uses a graph attention network, with robot-specific input node features constructed from partial schedules, to extract high-level robot embeddings and a separate Q network to evaluate discounted future rewards of state-action pairs for greedy schedule generation. The scheduler is trained with transitions generated from expert schedules using an imitation loss.

Additional description and examples of the imitation learning is provided in Wang. Zheyuan. and Matthew Gombolay. "Learning scheduling policies for multi-robot coordination with graph attention networks." IEEE Robotics and Automation Letters 5, no. 3 (2020): 4509-4516, which is provided in the priority document and incorporated by reference herein in its entirety.

Experimental Results and Examples

A study was conducted to evaluate the scheduler and its various components therein on problems involving homogeneous robot teams and heterogeneous robot teams.

Homogeneous robot teams study. The study evaluated the results of optimizing a generic objective function, which is the minimization of total makespan.

Dataset. To evaluate the performance of ScheduleNet, the study generated random problems based on Gombolay et al. (2013). The study simulated multi-agent construction of a large workpiece, e.g., an airplane fuselage, with three different configurations: a two-robot team, a five-robot team, and a ten-robot team. Task duration is generated from a uniform distribution in the interval [1; 10]. Approximately 25% of the tasks have absolute deadlines drawn from a uniform distribution in the interval [1, N×T], where N is the number of total tasks. The study used T=5 for two-robot teams, T=2 for five-robot teams, and T=1 for ten-robot teams. Approximately 25% of the tasks have wait constraints, and the duration of non-zero wait constraints is drawn from a uniform distribution in the interval [1; 10]. The study set the number of locations in a problem to be the same as the number of robots, and each task's location is picked randomly.

For each team configuration, problems are generated in three scales: small (16-20 tasks), medium (40-50 tasks), and large (80-100). For each problem scale, the study generated 1,000 problems for testing. To train the ScheduleNet model, the study generated another 1.000 small problems with the two-robot teams. The study ran Gurobi with a cutoff time of 15 minutes on generated problems to serve as exact baselines for the test set and expert demonstrations for the training set. This resulted in a total of 17,513 transitions for training. To further examine the scalability of ScheduleNet, the study also generated 100 ten-robot team problems in extra-large scale (160-200 tasks) and set the Gurobi cutoff time to be 1 hour, as the MILP formulation involves 300, 000+ general constraints and 160,000+ binary variables.

Benchmark The study performed benchmarks of ScheduleNet against several methods: EDF, Tercio, HomGNN, and Exact.

EDF benchmark employs a ubiquitous heuristic algorithm, earliest deadline first (EDF), that selects from a list of available tasks the one with the earliest deadline, assigning it to the first available worker.

Tercio benchmark employs a state-of-the-art scheduling algorithm for its problem domain, Tercio (Gombolay et al., 2018). Tercio is a hybrid algorithm that combines mathematical optimization for task allocation and an analytical sequencing test to ensure temporal and spatial feasibility. Hyperparameters are chosen from Gombolay et al. (2018).

HomGNN benchmark is a neural network-based method proposed in Wang and Gombolay (2019). The method uses a homogeneous GNN to exact problem embedding from the STN and a separate Q-network consisting of two FC layers to predict the Q-value. The model used the same hyperparameters in Wang and Gombolay (2019).

Exact benchmark employs Gurobi, a commercial optimization solver widely used for mixed-integer linear programming. The results are represented in the exact baseline.

Evaluation Metrics. To minimize the makespan, the study used the following metric for evaluation purposes. M1: Percentage of problems solved within optimality ratio. A problem is considered solved by an algorithm if the ratio, r, between the objective value it finds and the optimal value is within a certain range $$\left(\text{e.g., } r = \frac{z_{algorithm}}{z_{optimal}} \leq 1{:}1\right).$$

Gurobi solutions are used as the optimal value. If the algorithm finds a solution to the problem which Gurobi fails to solve within cutoff time, the study set r=1 on this problem during evaluation. By calculating this metric with different optimal ratios, the study obtained a comprehensive view of how the solution quality an algorithm finds is distributed.

Model Details. The study implemented ScheduleNet using PyTorch (Paszke et al., 2019) and Deep Graph Library (Wang et al., 2019a). The ScheduleNet used in training/testing was constructed by stacking four multi-head HetGAT layers (the first three used concatenation and the last one used averaging). The feature dimension of hidden layers was set to 64, and the number of heads was set to 8. The study set $\gamma=0.99$, $D=3.0$ and used Adam optimizer (Kingma and Ba, 2014) through training. The training procedure used a learning rate of $10^{-4}$, $\gamma_1=0.9$, $\gamma_2=0.1$, $q_o=3.0$, and batch size=8. Both training and evaluation were conducted on a Quadro RTX 8000 Graphics Processing Unit (GPU).

The ScheduleNet was trained on small problems of two-robot teams and the same model was evaluated on all the different problem scales and team configurations. As HomGNN is not scalable in a number of robots, for each team configuration, the study trained a new model on 1000 small problems and used it for evaluation on the rest. FIGS. 7A-7I show evaluations results on problems of the two, five, and ten homogenous robot teams, respectively, for a small problem (FIGS. 7A-7C), a medium problem (FIGS. 7D-7F), and a large problem (FIGS. 7G-7I). Specifically, in FIGS. 7A-7I the evaluation results of different methods are compared using M1, where the optimality ratio ranges from 1 to 2 with intervals of 0.05 by default.

For small problems (as shown in FIGS. 7A, 7D, and 7G), for small optimal ratio (r≤1:2), ScheduleNet outperformed three other heuristics (EDF, Tercio, and HomGNN) by a large margin and achieved significantly closer results to the exact method. This result shows the effectiveness of ScheduleNet in finding high-quality feasible schedules. The only case where HomGNN performed similarly was when examined under a large optimal ratio (r≤1.8), indicating HomGNN was able to find more low-quality solutions, which is often not preferred.

For medium problems (as shown in FIGS. 7B, 7E, and 7H), both EDF and Tercio tended to find high-quality schedules, but with a low percentage, while HomGNN found more feasible low-quality solutions. Again, ScheduleNet model significantly outperformed the other three methods. Even though only trained with small problems, the performance of ScheduleNet remained consistent in solving medium and large problems, where a notable performance drop was observed for other methods. HomGNN failed to find solutions to large problems within Gurobi cutoff time (at least 40 minutes vs. 15 minutes), thus it was not reported.

During evaluation on large (as shown in FIGS. 7C, 7F, and 7I) and ex-large problems (FIG. 11A), the study found that for some problems, the solutions found by SchedulerNet had better makespans than those found by Gurobi under its cutoff time. Therefore, the study showed ScheduleNet can extend the optimality ratio to the smallest value under which ScheduleNet still solved at least one problem in FIGS. 7F and 7I.

Figure 11A:
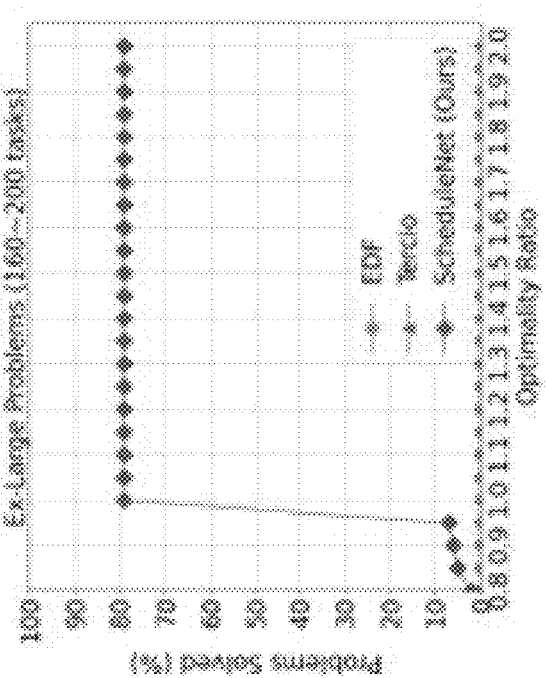
FIGS. 11A-11B show the evaluation results of trained models on extra-large problems and varying heterogeneous robot team configurations.

For ex-large problems (FIG. 11A). Gurobi failed to find most of the feasible solutions within the one-hour cutoff time (8 solved out of 100), while ScheduleNet managed to find substantially more feasible schedules (79 solved). These results demonstrated that the ScheduleNet model can transfer knowledge learned on a small problem to help solve larger problems by exploiting the scalability within heterogeneous graph formulation.

Figures 8A, 8B, 8C:
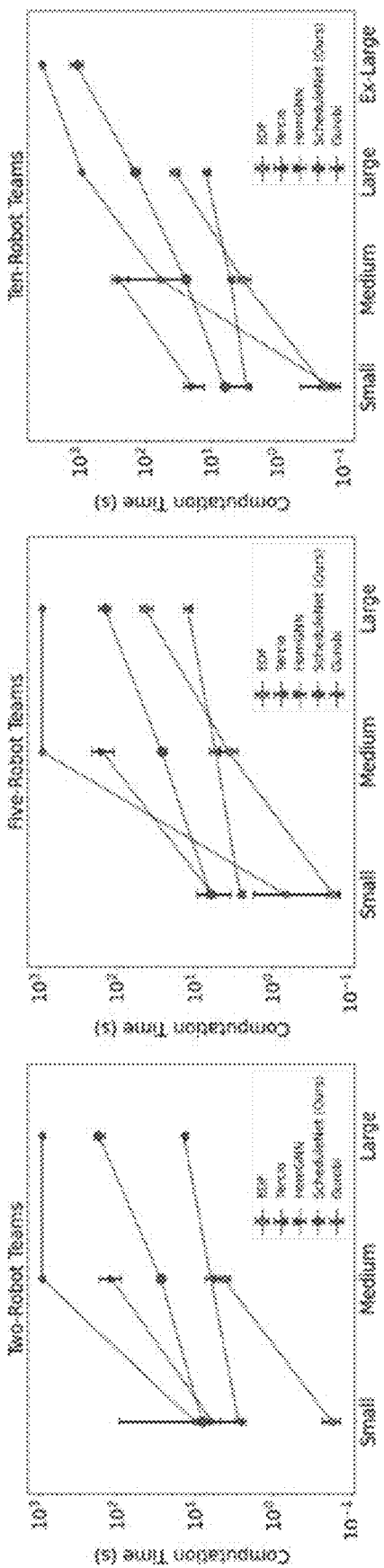
FIGS. 8A-8C show the computation time of different scheduling methods, where only feasible solutions were counted for each method.

FIGS. 8A-8C show the computation time of different methods where only feasible solutions were counted for each method. Specifically. FIGS. 8A-8C show the running time statistics for a two, five, and ten homogeneous robot-teams. The error bars denote the $25^{th}$ and $75^{th}$ percentile.

Due to differences in implementation details. CPU/GPU utilization, besides directly comparing the raw numbers, we also focused on the time changes of each method with respect to increasing problem sizes. When problem size increased, the performance of ScheduleNet stayed consistent with an affordable increase in computation time, which was less than Gurobi. This can be attributed largely to the fully convolutional structure as well as the STN simplification operation that greatly reduced its model complexity and computation cost. As the ten-robot team imposed a larger number of robot-related constraints than other team sizes, it took Gurobi less time to find solutions for ten-robot problems than two-and-five-robot problems. In contrast, HomGNN failed to scale up to 100 tasks within Gurobi cutoff time. This was mainly due to its structure, where FC layers are stacked on top of a GNN for Q-value prediction, making the model complexity proportional to $2 \times N_{task} \times N_{action}$, during parallel evaluation. As a comparison, the structural complexity of ScheduleNet is only proportional to $N_{task} + N_{action}$, considering $N_{robot}, N_{location} \ll N_{task}$.

Application-Specific Objective Function. To evaluate the performance of the scheduler 100 under a different objective function, $z = \Sigma_i c_i f_i$, the study generated problems involving fie-robot teams with two scales: small and medium, following the same parameters discussed above. Additionally, each task was associated with a real number cost, c, drawn from a uniform distribution in the interval [1, 10]. This cost is added to the input features of task nodes. For each problem scale, 1,00) problems were generated for testing. The study generated 1000 small problems for training the ScheduleNet. The study ran Gurobi on all problems with a cutoff time of 15 minutes to serve as exact baselines. The study used the same set of parameters during training as used in the total makespan case, except $q_o = 30$, considering the reward was generally larger. The study compared ScheduleNet against a Highest Cost Tardiness First (HCTF) priority heuristic which assigns the task with the highest cost to the first available worker in every scheduling decision.

Figures 9A, 9B:
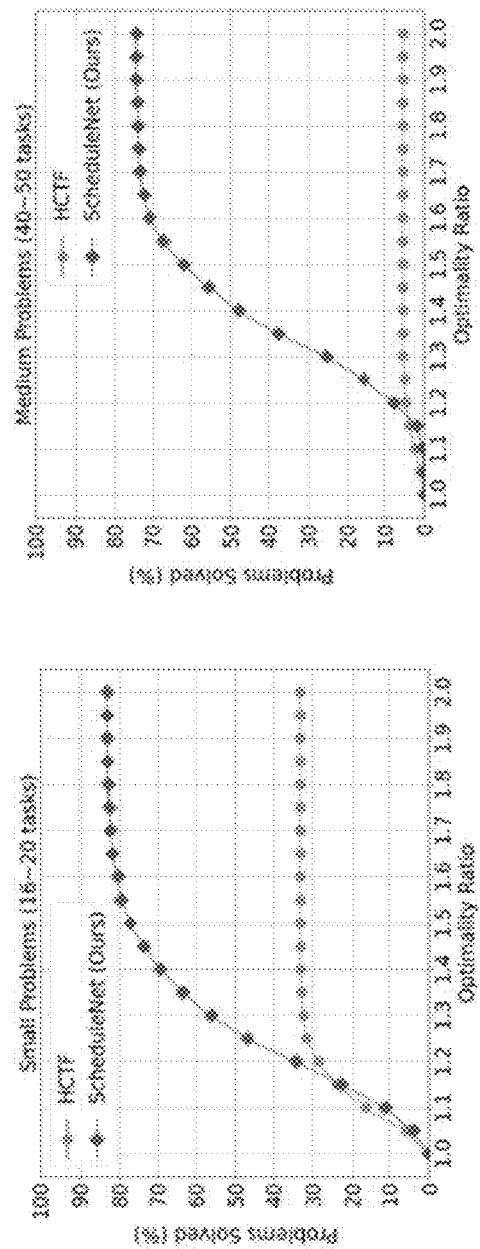
FIGS. 9A-9B show the evaluation results of minimizing the weighted sum of the completion times for a five-homogeneous-robot team for a small problem and a medium problem, respectively.

FIGS. 9A and 9B show the evaluation results of minimizing the weighed sum of the completion times for a five homogeneous robot team for a small problem and a medium problem, respectively. For $r \leq 1.2$ both methods solved similar number of problems. However, under larger optimality ratios. ScheduleNet started to outperform HCTF, resulting in a better overall performance.

Experimental Results on Heterogeneous Task Completion. The study evaluated the performance of ScheduleNet for coordinating robots that are heterogeneous in task completion time with the objective of minimizing the team's makespan.

Dataset and benchmark. The study generated random problems following the same setting and hyper-parameters as described in the homogeneous evaluation, with the following two differences:

First, for each task, $\tau_i$, the study sampled a mean value from [1, 10] and a gap value from [1, 3], both with uniform distributions. Then the study sampled $dur_{i,r}$ for each robot from a uniform distribution in the interval [mean–gap; mean+gap] (clamped at [1, 10] if applicable).

Second, the task locations were randomly sampled from the 2D map. The study used 2×2 for two-robot teams, 3×3 for five-robot teams, and 5×5 for ten-robot teams. The safety distance was set to 1. If $|Loc_i - Loc_j| \leq 1$, then $(\tau_i, \tau_j) \in L_{proximity}$.

Considering that HomGNN (Wang and Gombolay, 2019) is not designed for handling heterogeneous task completion among robots, the study benchmarked ScheduleNet against the remaining set of methods: EDF, Tercio. and Exact (i.e., a MILP solved by Gurobi).

Evaluation Model. For performance evaluation, the study used the same M1 metric discussed above. The ScheduleNet model also consisted of four multi-head HetGAT layers (the first three use concatenation and the last one uses averaging). The feature dimension of hidden layers was set to 64, and the number of heads was set to 8. The study set $\gamma = 0:95$, D=3:0 and used Adam optimizer. The training procedure used a learning rate of $3 \times 10^{-4}$, $\gamma_1 = 0.9$. $\gamma_2 = 0.3$, $q_o = 3.0$, and batch size=8. Both training and evaluation were conducted on a Quadro RTX 8000 GPU.

Same as in the homogeneous robot case, the study trained the ScheduleNet for heterogeneous robot teams on small problems of two-robot teams and evaluate the same model on varying problem scales and team configurations. Evaluation results using M1 are shown in FIGS. 10A-10I where optimality ratios range from 1 to 2 with intervals of 0.05 by default.

For small and medium problems (FIGS. 10A-10B, 10D-10E, and 10G-10H), ScheduleNet outperformed EDF and Tercio for medium-to-large optimality ratios ($r \geq 1.2$) other than small problems of ten-robot teams, and obtained results close to Tercio for $r \geq 1.5$ while consistently beating EDF. The improvement in the performance of ScheduleNet over the baseline models was particularly significant in medium problems of two-robot and five-robot teams in which ScheduleNet found feasible solutions for more than half of the problems, whereas Tercio and EDF found less than 15% for medium-to-high optimality ratios ($r \geq 1:2$). Compared to evaluation results for homogeneous robots, high-quality schedules for heterogeneous robots were much harder to find for all three methods, with a much lower success rate overall in finding a feasible schedule.

Figure 11B:
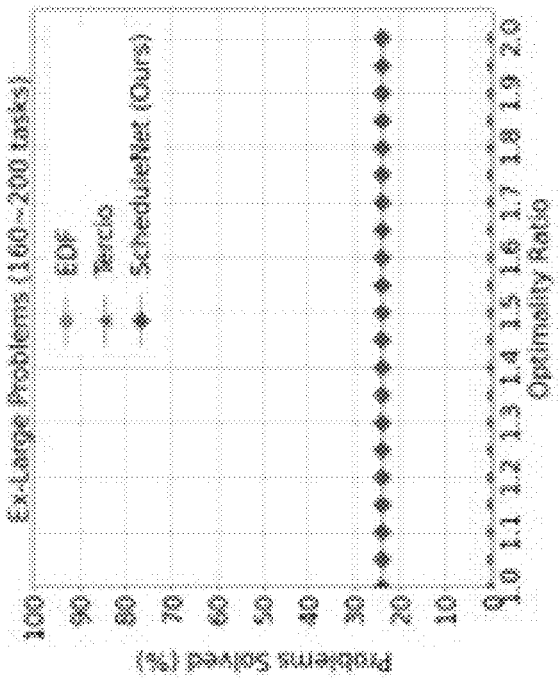

For large (FIGS. 10C, 10F, and 10I) and extra-large problems (FIG. 11B), the study showed ScheduleNet can extend the optimality ratios (measured relative to the solution returned by Gurobi) to the smallest value under which ScheduleNet solved at least one problem. In addition to finding schedules that were more optimal than Gurobi for ~10% of the problems. ScheduleNet models significantly outperformed EDF and Tercio by finding feasible solutions for >30% of large problems compared to less than 5% by the latter baselines. Notably, for extra-large problems. EDF, Tercio and Gurobi all failed to find any feasible solutions, whereas ScheduleNet was able to find schedules for up to 24% of the problems. These results further demonstrate ScheduleNet's capability of generalizing learned knowledge to solving larger unseen problems.

Figure 12A:
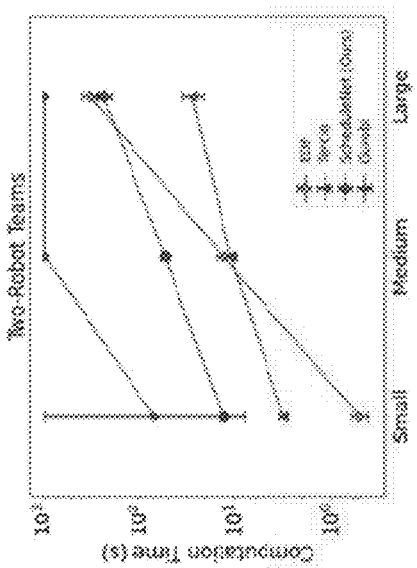
FIGS. 12A-12C show running time statistics of different scheduling methods, where only feasible solutions were counted for each method.
Figure 12B:
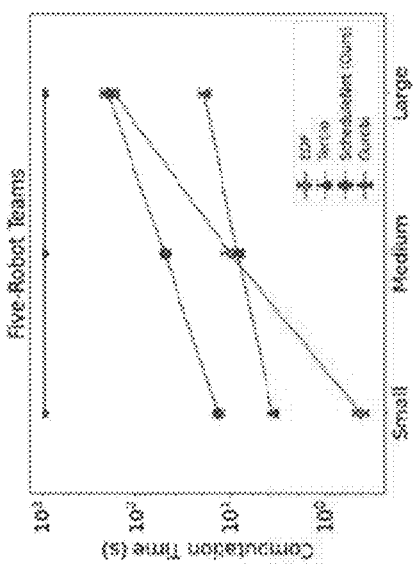
Figure 12C:
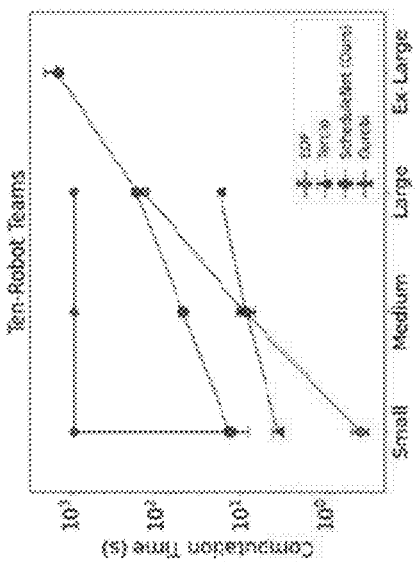

Running time statistics of different methods are shown in FIGS. 12A-12C, where the study counted only feasible solutions found by each method. Because these problems of coordinating heterogeneous robot teams were much harder than the homogeneous robot case (FIGS. 8A-8C), computation times in heterogeneous case (FIGS. 12A-12C) increased for all three methods. Furthermore, Gurobi timed out significantly more frequently.

For ScheduleNet, similar time change patterns with respect to increasing problem scales can be observed as the homogeneous robot case. Nonetheless, computation times of ScheduleNet are shorter than those of Gurobi and show a much better balance between solution quality and solving speed than EDF and Tercio, making ScheduleNet much more viable in practice.

Figure 13A:
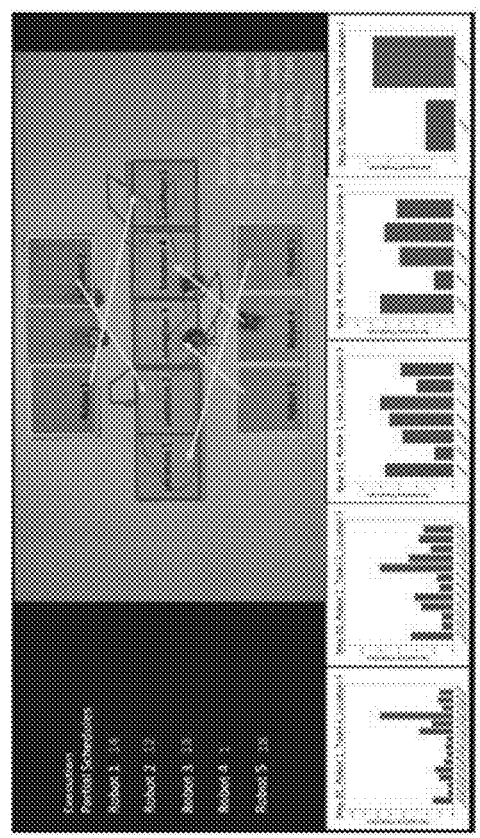
FIGS. 13A-13B show scheduling homogeneous robot teams and heterogeneous robot teams, respectively.
Figure 13B:
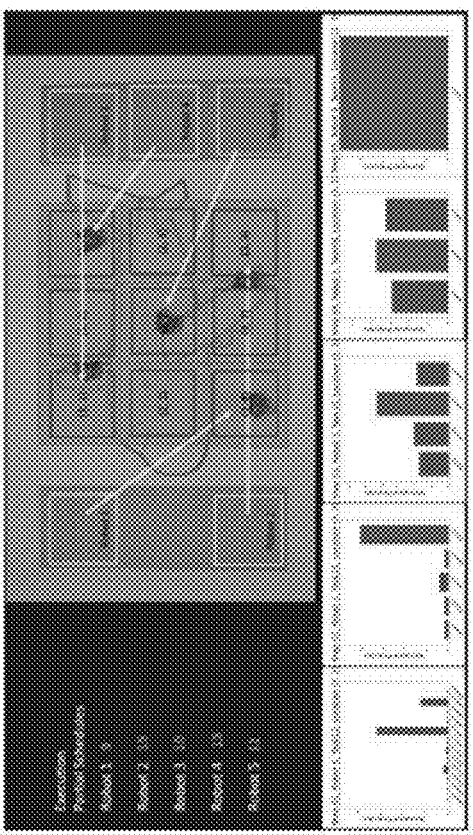

The study demonstrate the trained ScheduleNet model to coordinate the work of a five-robot team in a simulated environment for airplane fuselage construction, covering both homogeneous robot case in 1D space and heterogeneous robot case in 2D space. Our demo leverages the Robotarium, a remotely accessible swarm robotics research testbed with GRITSBot X robots (Wilson et al., 2020). Examples of scheduling homogeneous robot teams and heterogeneous robot teams are shown in FIGS. 13A and 13B, respectively. The ScheduleNet outputs for each step are depicted in bar plots at the bottom of each figure, with the selected task assignment highlighted in red. A detailed breakdown of the scheduling process with those examples can be found in the supplementary video.

DISCUSSION

Given the recent developments in robotic technologies and the increasing availability of collaborative robots (co-bots), multi-robot systems are increasingly being adopted in various manufacturing and industrial environments [30]. Research in related areas (e.g., multi-robot communication, team formation and control, path planning, task scheduling and routing) has also received significant attention [7]. The exemplary system and method address, inter alia, the problem of multi-robot task allocation and scheduling [15] with both temporal and spatial constraints, which captures the key challenges of final assembly manufacturing with robot teams. To achieve an optimal schedule for a user-specified objective, the robots must be allocated with the proper number of tasks and process these tasks with optimal order, while satisfying temporal constraints such as task deadlines and wait constraints. The addition of spatial constraints (i.e., a location can only be occupied by one robot at a time) makes task allocation difficult because algorithms must reason through inter-coupled, disjunctive time window constraints that govern shared resources.

Traditionally, the scheduling problem is formulated as a mixed-integer linear program (MILP), which can be approached with either exact methods or hand-crafted heuristics. However multi-robot scheduling with both temporal and spatial constraints is generally NP-hard [20]. Exact methods fail to scale to large-scale problems, which is exacerbated by the need for near real-time solutions to prevent factory slow-downs. Moreover, efficient approximation algorithms are hard to design. They not only require domain specific knowledge with respect to each problem configuration that usually takes years to gain, but they also require accurate feature engineering to encode such knowledge, which leaves much to be desired [18]. In recent years, deep neural networks have brought about breakthroughs in many domains, including image classification, nature language understanding and drug discovery, as they can discover intricate structures in high-dimensional data without hand-crafted feature engineering [14]. Promising progress has also been made towards learning heuristics for combinatorial optimization problems by utilizing graph neural networks to learn meaningful representations of the problem to guide the solution construction process [32]. Yet this research focuses on significantly easier problems with a simpler graphical structure. e.g., the traveling salesman problem (TSP).

The exemplary system and method provides a heterogeneous graph attention network model, called ScheduleNet, to learn heuristics for solving the multi-robot task allocation and scheduling problems with upper- and lowerbound temporal and spatial constraints.

Related Work. Task assignment and scheduling for multi-robot teams has been studied with various real-world applications, such as manufacturing, warehouse automation and delivery systems [15]. Korsah et al. [13] devised a widely accepted taxonomy, iTax, to categorize the Multi-Robot Task Allocation (MRTA) problem. Nunes et al. [15] further categorized the extensive research present in the multi-robot task allocation domain and identified possible solutions to this problem.

Task allocation is essentially an optimization problem, and the most common formalism to capture its constraints is Mixed Integer Linear Programming (MILP). As exact methods for solving MILP yield exponential complexity, researchers have combined MILP and constraint programming (CP) methods into a hybrid algorithm using decomposition [1, 8, 19] to accelerate computation. Other hybrid approaches exploited heuristic schedulers to gain better scalability [2, 3].

Learning heuristics for solving scheduling problems has been examined by several research groups. Wu et al. [28], Wang and Usher [26]. Zhang and Dietterich [31] applied reinforcement learning methods to learn domain-specific heuristics for job shop scheduling. Wang and Usher [26] developed a Q-learning based method for the single-machine dispatching rule selection problem. Wu et al. [28] proposed a multi-agent reinforcement learning method, called the ordinal sharing learning (OSL) method, for job-scheduling problems such as realizing load balancing inGrids. However, these methods depend on customized, hand-crafted features to achieve satisfying results. In contrast, in the exemplary method, the instant scheduler exploits the power of deep learning models to automatically learn useful features.

Graph neural networks (GNNs), as an extension of convolutional neural networks to a non-Euclidean domain, have been widely applied in graph-based problems such as node classification, link prediction and clustering, and show convincing performance [29]. Compared to the pervasive use of GNNs in classification problems, their application in solving combinatorial optimization is limited. Khalil et al. [10] input the node embeddings learned by a GNN into a Q-learning module and achieved better performance than previous heuristics on solving minimum vertex cover, maximum cut and TSPs. Kool et al. [12] combined GNNs and policy gradient methods to learn a deterministic policy for TSP and two variants of the Vehicle Routing Problem (VRP). Wang and Gombolay [27] developed a GNN-based model operating on the STN to generate schedules for coordinating multi-robot teams. However, their method uses homogeneous graphs and hard-codes robot and location information as node features, making it not scalable when the number of robots changes. Heterogeneous GNNs, which directly operate on heterogeneous graphs containing different types of nodes and links, have shown good interpretability and model expressiveness compared to traditional GNNs [25], but such a model has never been applied to combinatorial optimization problems. In contrast, the exemplary scheduler and method utilizes heterogeneous GNNs for scheduling multi-robot teams.

Problem Statement. To consider the problem of coordinating a multi-robot team in the same space, both temporal and resource/location constraints may be used. Its components ae described under the XD (STSR-TA) category of the widely accepted taxonomy proposed in [8], as a six-tuple <r; τ; d, w, Loc, z>.

The term r is the set of robot agents that we assume are homogeneous in task completion. The term τ is the set of tasks to be performed. Each task $\tau_i$ takes a certain amount of time $dur_{i,r}$ for a robot r to complete, and its scheduled start and finish time are denoted as $s_i$ and $f_i$, respectively (e.g., "task $\tau_i$ starts at 00:30, ends at 00:40, requiring 10 minutes" can be denoted as $s_i$=30, $f_i$=40, $dur_i$=10). The term $s_0$ may be used as the time origin and $f_0$ as the time point when all tasks are completed so that the schedule has a common start and end point. The term d is the set of deadline constraints, $d_i \in d$ specifies the time point before which task $\tau_i$ has to be completed. The term w is the set of wait constraints, $w_{i,j} \in w$ specifies the wait time between task $\tau_i$ and task $\tau_j$, e.g. $f_i \leq d_i$ (e.g., "task $\tau_i$ should wait at least 25 minutes after task $\tau_j$ finishes" means $s_i > f_j + 25$). The term Loc is the set of all task locations. At most, one task can be performed at each location at the same time. Finally, the term z is an objective function to minimize that includes the make-span and possibly other application-specific terms.

A solution to the problem consists of an assignment of tasks to agents and a schedule for each agent's tasks such that all constraints are satisfied and the objective function is minimized. The mathematical program (MP) formation of an example problem is included in Eqs. 18-26. A generic objective function is presented as application-specific goals may vary. Minimizing the make-span (i.e., overall process duration) is considered, which would be $z=\max_i f_i$.

$$\min(z) \quad (Eq. 18)$$

Two types of binary decision variables are introduced: 1) $A_{r,i}$=1 for the assignment of robot r to task $\tau_i$ and 2) $X_{i,j}$=1 denotes task $\tau_i$ finishes before task $\tau_j$ starts. $L_{same}$ is the set of task pairs ($\tau_i$, $\tau_j$) that use the same location and is derived from Loc. Continuous decision variables $s_i, f_i$ [0,∞) is used to correspond to the start and finish times of task $\tau_i$, respectively. Eq. 19 ensures that each task is assigned to only one agent.

$$\sum_{r \in r} A_{r,i} = 1, \forall_{\tau_i} \in \tau \quad (Eq. 19)$$

Eqs. 20-22 ensure that all the temporal constraints are met.

$$f_i - s_i = \sum_{r \in r} dur_{i,r} A_{r,i}, \forall \tau_i \in \tau \quad (Eq. 20)$$

$$f_i - s_o \leq d_i, \forall_{d_i} \in d \quad (Eq. 21)$$

$$s_i - f_j \geq w_{i,j}, \forall_{w_{i,j}} \in w \quad (Eq. 22)$$

Eqs. 23 and 24 ensure that robots can only perform one task at a time.

$$(s_i - f_i) A_{r,i} A_{r,j} X_{i,j} \geq 0, \forall \tau_i, \tau_j \in \tau, \forall_r \in r \quad (Eq. 23)$$

$$(s_i - f_j) A_{r,i} A_{r,j} (1 - X_{i,j}) \geq 0, \forall \tau_i, \tau_j \in \tau, \forall_r \in r \quad (Eq. 24)$$

Eqs. 25 and 26 account for task locations that can only be occupied by one robot at a time.

$$(s_i - f_i) X_{i,j} \geq 0, \forall (\tau_i, \tau_j) \in L_{proximity} \quad (Eq. 25)$$

$$(s_i - f_j)(1 - X_{i,j}) \geq 0, \forall (\tau_i, \tau_j) \in L_{proximity} \quad (Eq. 26)$$

Coordinating a set of homogeneous robots may be first considered to complete a set of tasks given temporal constraints and 1D task location constraints (i.e., no two robots can be in the same place at the same time). Here, homogeneity in robot teams refers to teams comprised of robots that are equally proficient in completing a task (i.e., $dur_{i,r} = dur_i$, $\forall_r \in r, \forall_{\tau_i} \in \tau$). This modeling setup is motivated by common manufacturing scenarios in which work locations are along a line with robots moving across a rail to perform assembly tasks of a large workpiece, e.g., the Boeing 777 Fuselage Automated Upright Build process (Tang and Webb, 2019). Under this setting. $L_{proximity}$ consists of all task pairs that require the same location to be completed.

Second, we examine scheduling problems involving heterogeneous robots moving with 2D proximity constraints (Section 7). The relaxation to heterogeneous robot teams allows for the full expressivity where $dur_{i,r} \neq dur_i$ in general. Furthermore, expanding from 1 D location constraints to 2D proximity constraints allows us to model an open factory floor concept where a certain distance must be maintained between robots while executing tasks. In these experiments, we extend $L_{proximity}$ to include task pairs whose locations fall within the minimum allowed safety distance.

As z varies depending on application-specific goals, discussed herein, the results of minimizing the makespan (i.e., overall process duration, $z=\max_i f_i$) as a generic objective function are reported. To show the generalization of our method, an application-specific case is later shown where the weighted sum of the completion time of all tasks ($z=\Sigma_i c_i f_i$) are minimized. This objective function may be used as an analogy to the minimization of weighted tardiness in job-shop scheduling [5].

It should be appreciated that the logical operations described above and in the appendix can be implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, acts, or modules. These operations, acts and/or modules can be implemented in software, in firmware, in special purpose digital logic, in hardware, and any combination thereof. It should also be appreciated that more or fewer operations can be performed than shown in the figures and described herein. These operations can also be performed in a different order than those described herein.

In its most basic configuration, computing device typically includes at least one processing unit and system memory. Depending on the exact configuration and type of computing device, system memory 230 may be volatile (such as random-access memory (RAM)), non-volatile (such as read-only memory (ROM), flash memory, etc.), or some combination of the two. The processing unit may be a standard programmable processor that performs arithmetic and logic operations necessary for operation of the computing device. As used herein, processing unit and processor refers to a physical hardware device that executes encoded instructions for performing fmdunctions on inputs and creating outputs, including, for example, but not limited to, microprocessors (MCUs), microcontrollers, graphical processing units (GPUs), and application specific circuits (ASICs). Thus, while instructions may be discussed as executed by a processor, the instructions may be executed simultaneously, serially, or otherwise executed by one or multiple processors. The computing device may also include a bus or other communication mechanism for communicating information among various components of the computing device.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language and it may be combined with hardware implementations.

Moreover, the various components may be in communication via wireless and/or hardwire or other desirable and available communication means, systems and hardware. Moreover, various components and modules may be substituted with other modules or components that provide similar functions.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "5 approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g. 1 to 5 includes 1, 1.5, 2, 2.75, 3, 3.90, 4, 4.24, and 5).

Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The following patents, applications and publications as listed below and throughout this document are hereby incorporated by reference in their entirety herein.

[1] Jacques F Benders. Partitioning procedures for solving mixed-variables programming problems. Numerische mathematik, 4(1):238-252, 1962.

[2] Elkin Castro and Sanja Petrovic. Combined mathematical programming and heuristics for a radiotherapy pretreatment scheduling problem. Journal of Scheduling, 15 (3):333-346, 2012.

[3] Jiaqiong Chen and Ronald G Askin. Project selection, scheduling and resource allocation with time dependent returns. European Journal of Operational Research, 193 (1):23-34, 2009.

[4] Rina Dechter, Itay Meiri, and Judea Pearl. Temporal constraint networks. Artificial intelligence, 49(1-3):61-95, 1991.
[5] Imen Essafi. Yazid Mati. and St'ephane Dauzere-Peres. A genetic local search algorithm for minimizing total weighted tardiness in the job-shop scheduling problem. Computers & Operations Research, 35(8):2599-2616, 2008.
[6] Robert W Floyd. Algorithm 97: shortest path. Communications of the ACM, 5(6):345, 1962.
[7] Eduardo Feo Flushing. Luca M Gambardella, and Gianni A Di Caro. Simultaneous task allocation, data routing, and transmission scheduling in mobile multirobot teams. In 2017 IEEE/RSJ International Conference on Intelligent Robots and Systems (IROS), pages 1861-1868. IEEE, 2017.
[8] Matthew Gombolay, Ronald Wilcox, and Julie Shah. Fast scheduling of multi-robot teams with temporospatial constraints. In Robotics: Science and System. pages 49-56, 2013.
[9] Matthew C Gombolay. Ronald J Wilcox, and Julie A Shah. Fast scheduling of robot teams performing tasks with temporospatial constraints. IEEE Transactions on Robotics, 34(1):220-239, 2018.
[10] Elias Khalil. Hanjun Dai, Yuyu Zhang, Bistra Dilkina, and Le Song. Learning combinatorial optimization algorithms over graphs. In Advances in Neural Information Processing Systems, pages 6348-6358, 2017.
[11] Diederik P Kingma and Jimmy Ba. Adam: A method for stochastic optimization. arXiv preprint arXiv:1412.6980, 2014.
[12] Wouter Kool, Herke van Hoof, and Max Welling. Attention. Learn to Solve Routing Problems! In International Conference on Learning Representations, 2019.
[13] G Ayorkor Korsah, Anthony Stentz, and M Bernardine Dias. A comprehensive taxonomy for multi-robot task allocation. The International Journal of Robotics Research, 32(12):1495-1512, 2013.
[14] Yann LeCun, Yoshua Bengio, and Geoffrey Hinton. Deep learning. nature, 521(7553):436-444, 2015.
[15] Ernesto Nunes, Marie Manner, Hakim Mitiche, and Maria Gini. A taxonomy for task allocation problems with temporal and ordering constraints. Robotics and Autonomous Systems, 90:55-70, 2017.
[16] Adam Paszke, Sam Gross, Francisco Massa, Adam Lerer, James Bradbury, Gregory Chanan, Trevor Killeen, Zeming Lin, Natalia Gimelshein, Luca Antiga, Alban Desmaison, Andreas Kopf, Edward Yang, Zachary DeVito, Martin Raison, Alykhan Tejani, Sasank Chilamkurthy, Benoit Steiner, Lu Fang, Junjie Bai, and Soumith Chintala, PyTorch: An Imperative Style. High-Performance Deep Learning Library. In Advances in Neural Information Processing Systems 32, pages 8024-8035, 2019.
[17] Bilal Piot, Matthieu Geist, and Olivier Pietquin. Boosted bellman residual minimization handling expert demonstrations. In Joint European Conference on Machine Learning and Knowledge Discovery in Databases, pages 549-564. Springer, 2014.
[18] Hema Raghavan, Omid Madani, and Rosie Jones. Active learning with feedback on features and instances. Journal of Machine Learning Research, 7(August):1655-1686, 2006.
[19] Huizhi Ren and Lixin Tang. An improved hybrid milp/cp algorithm framework for the job-shop scheduling. In 2009 IEEE International Conference on Automation and Logistics, pages 890-894. IEEE, 2009.
[20] Marius M Solomon. On the worst-case performance of some heuristics for the vehicle routing and scheduling problem with time window constraints. Networks, 16(2): 161-174, 1986.
[21] Ioannis Tsamardinos. Reformulating temporal plans for efficient execution. Master's thesis, University of Pittsburgh, 2000.
[22] Ioannis Tsamardinos and Martha E Pollack. Efficient solution techniques for disjunctive temporal reasoning problems. Artificial Intelligence, 151(1-2):43-89, 2003.
[23] Petar Velickovic, Guillem Cucurull, Arantxa Casanova, Adriana Romero, Pietro Lio, and Yoshua Bengio. Graph attention networks. arXiv preprint arXiv:1710.10903, 2017.
[24] Minjie Wang, Lingfan Yu, Da Zheng, Quan Gan, Yu Gai, Zihao Ye, Mufei Li, Jinjing Zhou, Qi Huang, Chao Ma, Ziyue Huang, Qipeng Guo, Hao Zhang, Haibin Lin, Junbo Zhao, Jinyang Li, Alexander J Smola, and Zheng Zhang. Deep Graph Library: Towards Efficient and Scalable Deep Learning on Graphs. ICLR Workshop on Representation Learning on Graphs and Manifolds, 2019.
[25] Xiao Wang, Houye Ji, Chuan Shi, Bai Wang, Yanfang Ye, Peng Cui, and Philip S Yu. Heterogeneous graph attention network. In The World Wide Web Conference, pages 2022-2032. ACM, 2019.
[26] Yi-Chi Wang and John M Usher. Application of reinforcement learning for agent-based production scheduling. Engineering Applications of Artificial Intelligence, 18(1):73-82, 2005.
[27] Zheyuan Wang and Matthew Gombolay. Learning to Dynamically Coordinate Multi-Robot Teams in Graph Attention Networks. arXiv preprint arXiv:1912.02059, 2019.
[28] Jun Wu, Xin Xu, Pengcheng Zhang, and Chunming Liu. A novel multi-agent reinforcement learning approach for job scheduling in grid computing. Future Generation Computer Systems, 27(5):430-439, 2011.
[29] Keyulu Xu, Weihua Hu, Jure Leskovec, and Stefanie Jegelka. How Powerful are Graph Neural Networks? In International Conference on Learning Representations, 2019.
[30] Zhi Yan, Nicolas Jouandeau, and Arab Ali Cherif. A survey and analysis of multi-robot coordination. International Journal of Advanced Robotic Systems, 10(12): 399, 2013.
[31] Wei Zhang and Thomas G Dietterich. A reinforcement learning approach to job-shop scheduling. In IJCAI, volume 95, pages 1114-1120. Citeseer, 1995.
[32] Jie Zhou, Ganqu Cui, Zhengyan Zhang, Cheng Yang, Zhiyuan Liu, Lifeng Wang, Changcheng Li, and Maosong Sun. Graph neural networks: A review of methods and applications. arXiv preprint arXiv:1812.08434, 2018.
[33] Bengio Y, Lodi A, Prouvost A (2020) Machine learning for combinatorial optimization: a methodological tour d'horizon. European Journal of Operational Research.
[34] Bogner K, Pferschy U, Unterberger R, Zeiner H (2018) Optimised scheduling in human-robot collaboration-a use case in the assembly of printed circuit boards. International Journal of Production Research 56(16):5522,5540.
[35] Casalino A, Zanchettin A M, Piroddi L, Rocco P (2019) Optimal scheduling of human-robot collaborative assembly operations with time petri nets. IEEE Transactions on Automation Science and Engineering Castro E. Petrovic S (2012) Combined mathematical programming and heuristics for a radiotherapy pretreatment scheduling problem. Journal of Scheduling 15(3):333,346.

[36] Choudhury S, Gupta J, Kochenderfer M J, Sadigh D. Bohg J (2020) Dynamic multi-robot task allocation under uncertainty and temporal constraints. In: Proceedings of Robotics: Science and Systems (RSS), DOI 10.15607/rss.2020.xvi.068.

[37] Fout A, Byrd J, Shariat B, Ben-Hur A (2017) Protein interface prediction using graph convolutional networks. In: Advances in neural information processing systems, pp 6530.6539.

[38] Hamaguchi T, Oiwa H, Shimbo M, Matsumoto Y (2017) Knowledge transfer for out-of-knowledge-base entities: A graph neural network approach. arXiv preprint arXiv:170605674

[39] Hamilton W L, Ying R, Leskovec J (2018) Inductive representation learning on large graphs, 1706.02216.

[40] Hari S K K, Nayak A, Rathinam S (2020) An approximation algorithm for a task allocation, sequencing and scheduling problem involving a human-robot team. IEEE Robotics and Automation Letters 5(2):2146, 2153.

[41] Johnson D B (1977) Efficient algorithms for shortest paths in sparse networks. Journal of the ACM (JACM) 24(1):1,13.

[42] Kartal B, Nunes E, Godoy J, Gini M (2016) Monte carlo tree search with branch and bound for multi-robot task allocation. In: The IJCAI-16 workshop on autonomous mobile service robots. vol 33.

[43] Nikou A, Boskos D, Tumova J, Dimarogonas D V (2017) Cooperative planning for coupled multi-agent systems under timed temporal specifications. In: 2017 American Control Conference (ACC), IEEE, pp 1847, 1852.

[44] Shiue Y R, Lee K C, Su C T (2018) Real-time scheduling for a smart factory using a reinforcement learning approach. Computers & Industrial Engineering 125:604,614.

[45] Solovey K, Bandyopadhyay S, Rossi F, Wolf M T, Pavone M (2020) Fast near-optimal heterogeneous task allocation via flow decomposition. arXiv preprintar Xiv:201103603.

[46] Tang G, Webb P (2019) Human-robot shared workspace in aerospace factories. Human-robot interaction: safety. standardization. and benchmarking pp 71,80.

[47] Wang H, Chen W. Wang J (2020) Coupled task scheduling for heterogeneous multi-robot system of two robot types performing complex-schedule order fulfillment tasks. Robotics and Autonomous Systems p 103560.

[48] Wang Y, Sun Y, Liu Z. Sarma S E. Bronstein M M. Solomon J M (2019c) Dynamic graph cnn for learning on point clouds. Acm Transactions On Graphics (tog) 38(5): 1,12.

[49] Wang Z, Gombolay M (2020) Heterogeneous graph attention networks for scalable multi-robot scheduling with temporospatial constraints. In: Robotics: Science and System XVI.

[50] Wilson S, Glotfelter P, Wang L, Mayya S, Notomista G, Mote Mm Egerstedt M (2020) The robotarium: Globally impactful opportunities. challenges, and lessons learned in remote-access, distributed control of multirobot systems. IEEE Control Systems Magazine 40(1):26,44.

[51] Wu Z, Pan S, Chen F, Long G, Zhang C, Philip S Y (2020) A comprehensive survey on graph neural networks. IEEE Transactions on Neural Networks and Learning Systems.

[52] Yan S, Xiong Y, Lin D (2018) Spatial temporal graph convolutional networks for skeleton-based action recognition. In: Proceedings of the AAAI Conference on Artificial Intelligence, vol 32, pp 7444.7452.

[53] Yang X, Deng C, Liu T, Tao D (2020) Heterogeneous graph attention network for unsupervised multiple-target domain adaptation. IEEE Transactions on Pattern Analysis and Machine Intelligence.

[54] Zhang S, Chen Y, Zhang J, Jia Y (2020) Real-time adaptive assembly scheduling in human-multi-robot collaboration according to human capability. In: 2020 IEEE International Conference on Robotics and Automation (ICRA), IEEE, pp 3860.3866.

What is claimed is:

1. A computer-implemented method to efficiently coordinate multi-robot tasks performed by a plurality of heterogeneous robot equipment of different types, the method comprising:

collecting, by a hardware scheduler, at each of a plurality of schedule-able time steps, a list of available heterogeneous robot equipment into a set of available heterogeneous robot equipment; and performing, by the hardware scheduler, a plurality of simulations to iteratively select each heterogeneous robot equipment from the set of available heterogeneous robot equipment and assign respective ones of the multi-robot tasks to each of the selected heterogeneous robot equipment using a Q-network, wherein each simulated assignment comprises:

receiving, by the hardware scheduler, temporal constraints comprising: deadlines and wait constraints of each of the multi-robot tasks and an objection for a minimizing of an overall process duration of the multi-robot tasks;

receiving, by the hardware scheduler, spatial constraints comprising: a first spatial constraint requiring that a location can only be occupied by one of the heterogeneous robot equipment at a time and a second spatial constraint requiring a minimum safety distance allowed between each of the plurality of heterogeneous robot equipment while executing the multi-robot tasks;

inputting, by the hardware scheduler, into a simple temporal network (STN)-based model, a plurality of nodes corresponding to the multi-robot tasks, each represented by a start time node and a finish time node;

reducing, by the hardware scheduler, complexity of the simple temporal network (STN)-based model by removing all finish time nodes of the multi-robot tasks, except for a time point when all the multi-robot tasks will be completed while preserving all the temporal constraints or providing a reduced STN model of the STN;

building, by the hardware scheduler, a heterogeneous graph g from states in the STN-based model that convolutionality encodes into the heterogeneous graph g: the temporal constraints, the spatial constraints, and at least one other constraint associated with the available heterogeneous robot equipment, locations of the available heterogeneous robot equipment, specific locations of the multi-robot tasks, and shared tools employed by the available heterogeneous robot equipment;

computing, by the hardware scheduler using heterogeneous graph attention layers of a graph attention network, input features for the plurality of nodes in the heterogeneous graph g, wherein the input features comprises: a minimum of an expected time to complete an unscheduled task of a plurality of unscheduled tasks, a maximum of the expected time to complete the unscheduled task, a mean of the expected time to complete the unscheduled task, and a standard deviation of the expected time to complete the unscheduled task;

merging, by the hardware scheduler, the inputted features as a multi-head output for each multi-head layer in the heterogeneous graph attention layers of the graph attention network using at least a concatenation and an averaging;

learning, by the hardware scheduler, a greedy policy for sequential decision making by constructing a schedule as a Markov decision process (MDP) using a tuple that includes at least: a first tuple comprising the states at each decision-step that includes the temporal constraints represented by the STN, the locations of the available heterogeneous robot equipment, and all, previously constructed, partial schedules of the available heterogeneous robot equipment, a second tuple comprising actions corresponding to appending the unscheduled task at end of a partial schedule of a selected one of the available heterogeneous robot equipment, a third tuple comprising transitions, corresponding to adding edges associated with each of the actions into the STN and updating the partial schedule of the selected one of the available heterogeneous robot equipment, a fourth tuple comprising a reward of a state-action pair defined as a change in an objective value after taking one of the actions while minimizing the overall process duration and a fifth tuple comprising a discount factor;

employing, by the hardware scheduler, imitation learning to train the Q-network, by scaling up, the heterogeneous graph g from small-scale solutions employed by an expert, to large scale problems solved by grounding, below a total value of the reward, Q-values of alternative actions not selected by the expert while ensuring that a gradient is trained only on alternative, unselected actions with a maximum Q-value, and ensuring that the gradient is propagated through all the alternative unselected actions that have a subset of the Q-values higher than a difference between the total value of the reward and an empirically selected offset constant;

employing, by the hardware scheduler, the graph attention network, the input features, the transitions, and a result of the imitation learning to generate a greedy schedule; and iteratively selecting, by the hardware scheduler, based on the greedy policy, the greedy schedule having assignments of the multi-robot tasks to each of the selected heterogeneous robot equipment, the greedy schedule in accordance with a policy from the group consisting of: a first policy associated with first availability of a first one of the available heterogeneous robot equipment, a second policy associated with a minimum average time on the plurality of unscheduled tasks, a third policy associated with a minimum time on any one of the plurality of unscheduled task, a fourth policy associated with a minimum average time on all of the multi-robot tasks.

2. The method of claim 1, wherein the STN-based model comprises (i) a first graph portion that encodes the temporal constraints and (ii) second network portion that encodes the task and the available heterogeneous robot equipment.

3. The method of claim 1, wherein the STN-based model encodes the temporal constraints and at least one constraint associated with spatial constraints, available robots, robot locations, task locations, and shared resources.

4. The method of claim 1, wherein the STN-based model is built by:
generating a first graph comprising a plurality of task nodes comprising a start time node and a finish time node; and
generating a second graph as the STN-based model by removing the finish time node.

5. The method of claim 1, wherein the simple temporal network STN-based model is built by:
generating a base graph comprising a minimum distance graph;
adding a plurality of robot nodes to the base graph, wherein each robot node of the plurality of robot nodes is connected to an assigned task node, and wherein each robot node of the plurality of robot nodes is connected to other robot nodes of the plurality of robot nodes;
adding a plurality of location nodes to the base graph, wherein each location node of the plurality of location nodes is connected to an assigned task node, and wherein each location node of the plurality of location nodes is connected to other location nodes of the plurality of location nodes; and
adding a plurality of state summary nodes to the base graph, wherein each state summary node of the plurality of state summary nodes is connected to a task node, a robot node, and a location node.

6. The method of claim 5, further comprising:
adding a plurality of Q-value nodes to the base graph, where each of the Q-value nodes of the plurality of Q-value nodes is connected to a task node, a robot node, and a location node.

7. The method of claim 1, wherein the STN-based model is generated in part using Johnson algorithm or Floyd Warshall algorithm to generate a minimum distance graph as a structure for the STN-based model.

8. The method of claim 1, wherein the plurality of heterogeneous robot equipment comprise at least one of robotic equipment, manufacturing equipment, and transport equipment.

9. The method of claim 1, wherein the plurality of heterogeneous robot equipment comprise machines in combination with one or more human workers with assigned tasks in manufacturing, assembling, distributing workflow.

10. A hardware scheduler system comprising:
a processor; and
a memory operatively coupled to the processor, the memory having instructions stored therein, wherein execution of the instructions by the processor causes the processor to:
efficiently coordinate multi-robot tasks performed by a plurality of heterogeneous robot equipment of different types, wherein the coordinating includes:
at each of a plurality of schedule-able time steps, a hardware scheduler collecting a list of available heterogeneous robot equipment into a set of available heterogeneous robot equipment; and
performing, by the hardware scheduler, a plurality of simulations to iteratively select each heterogeneous robot equipment from the set of available heterogeneous robot equipment and assign respective ones of the multi-robot tasks to each of the selected heterogeneous robot equipment using a Q-network, wherein each simulated assignment comprises:

receiving, by the hardware scheduler, temporal constraints comprising:
deadlines and wait constraints of each of the multi-robot tasks and an objection for a minimizing of an overall process duration of the multi-robot tasks;
receiving, by the hardware scheduler, spatial constraints comprising: a first spatial constraint requiring that a location can only be occupied by one of the heterogeneous robot equipment at a time and a second spatial constraint requiring a minimum safety distance allowed between each of the plurality of heterogeneous robot equipment while executing the multi-robot tasks;
inputting, by the hardware scheduler, into a simple temporal network (STN)-based model, a plurality of nodes corresponding to the multi-robot tasks, each represented by a start time node and a finish time node;
reducing, by the hardware scheduler, complexity of the STN-based model by removing all finish time nodes of the multi-robot tasks, except for a time point when all the multi-robot tasks will be completed, while preserving all the temporal constraints or providing a reduced STN model of the STN;
building, by the hardware scheduler, a heterogeneous graph g from states in the STN-based model that convolutionality encodes into the heterogeneous graph g: the temporal constraints, the spatial constraints, and at least one other constraint associated with the available heterogeneous robot equipment, locations of the available heterogeneous robot equipment, specific locations of the multi-robot tasks, and shared tools employed by the available heterogeneous robot equipment;
computing, by the hardware scheduler using heterogeneous graph attention layers of a graph attention network, input features for the plurality of nodes in the heterogeneous graph g, wherein the input features comprise: a minimum of an expected time to complete an unscheduled task of a plurality of unscheduled tasks, a maximum of the expected time to complete the unscheduled task, a mean of the expected time to complete the unscheduled task, and a standard deviation of the expected time to complete the unscheduled task;
merging, by the hardware scheduler, the inputted features as a multi-head output for each multi-head layer in the heterogeneous graph attention layers of the graph attention network using one of a concatenation and an averaging;
learning, by the hardware scheduler, a greedy policy for sequential decision making by constructing a schedule as a Markov decision process (MDP) using a tuple that includes at least: a first tuple comprising the states at each decision-step that includes the temporal constraints represented by the STN, the locations of the available heterogeneous robot equipment, and all, previously constructed, partial schedules of the available heterogeneous robot equipment, a second tuple comprising actions corresponding to appending the unscheduled task at end of a partial schedule of a selected one of the available heterogeneous robot equipment, a third tuple comprising transitions, corresponding to adding edges associated with each of the actions into the STN and updating the partial schedule of the selected one of the available heterogeneous robot equipment, a fourth tuple comprising a reward of a state-action pair defined as a change in an objective value after taking one of the actions while minimizing the overall process duration and a fifth tuple comprising a discount factor;
employing, by the hardware scheduler, imitation learning to train the Q-network, by scaling up, the heterogeneous graph g from small-scale solutions employed by an expert, to large scale problems solved by grounding, below a total value of the reward, Q-values of alternative actions not selected by the expert while ensuring that a gradient is trained only on alternative, unselected actions with a maximum Q-value, and ensuring that the gradient is propagated through all the alternative unselected actions that have a subset of the Q-values higher than a difference between the total value of the reward and an empirically selected offset constant;
employing, by the hardware scheduler, the graph attention network, the input features, the transitions, and a result of the imitation learning to generate a greedy schedule; and
iteratively selecting, by the hardware scheduler, based on the greedy policy, the greedy schedule having assignments of the multi-robot tasks to each of the selected heterogeneous robot equipment, the greedy schedule in accordance with a policy from the group consisting of: a first policy associated with first availability of a first one of the available heterogeneous robot equipment, a second policy associated with a minimum average time on the plurality of unscheduled tasks, a third policy associated with a minimum time on any one of the plurality of unscheduled task, a fourth policy associated with a minimum average time on all of the multi-robot tasks.

11. The hardware scheduler system of claim 10, wherein the STN-based model comprises (i) a first graph portion that encodes the temporal constraints and (ii) a second graph portion that encodes the task and the available heterogeneous robot equipment.

12. A non-transitory computer-readable medium having instructions stored thereon, wherein the instructions, when executed by a processor, cause the processor to:
efficiently coordinate multi-robot tasks performed by a plurality of heterogeneous robot equipment of different types, wherein the coordinating includes:
at each of a plurality of schedule-able time steps, a hardware scheduler collecting a list of available heterogeneous robot equipment into a set of available heterogeneous robot equipment; and
performing, by the hardware scheduler, a plurality of simulations to iteratively select each heterogeneous robot equipment from the set of available heterogeneous robot equipment and assign respective ones of the multi-robot tasks to each of the selected heterogeneous robot equipment using a Q-network, wherein each simulated assignment comprises:
receiving, by the hardware scheduler, temporal constraints comprising:
deadlines and wait constraints of each of the multi-robot tasks and an objection for a minimizing of an overall process duration of the multi-robot tasks;
receiving, by the hardware scheduler, spatial constraints comprising: a first spatial constraint requiring that a location can only be occupied by one of the heterogeneous robot equipment at a time and a second spatial constraint requiring a minimum safety distance allowed between each of the plurality of heterogeneous robot equipment while executing the multi-robot tasks;

inputting, by the hardware scheduler, into a simple temporal network (STN)-based model, a plurality of nodes corresponding to the multi-robot tasks, each represented by a start time node and a finish time node;

reducing, by the hardware scheduler, complexity of the STN-based model by removing all finish time nodes of the multi-robot tasks, except for a time point when all the multi-robot tasks will be completed, while preserving all the temporal constraints or providing a reduced STN model of the STN;

building, by the hardware scheduler, a heterogeneous graph g from states in the STN-based model that convolutionality encodes into the heterogeneous graph g: the temporal constraints, the spatial constraints, and at least one other constraint associated with the available heterogeneous robot equipment, locations of the available heterogeneous robot equipment, specific locations of the multi-robot tasks, and shared tools employed by the available heterogeneous robot equipment;

computing, by the hardware scheduler using heterogeneous graph attention layers of a graph attention network, input features for the plurality of nodes in the heterogeneous graph g, wherein the input features comprise: a minimum of an expected time to complete an unscheduled task of a plurality of unscheduled tasks, a maximum of the expected time to complete the unscheduled task, a mean of the expected time to complete the unscheduled task, and a standard deviation of the expected time to complete the unscheduled task;

merging, by the hardware scheduler, the inputted features as a multi-head output for each multi-head layer in the heterogeneous graph attention layers of the graph attention network using a concatenation and an averaging;

learning, by the hardware scheduler, a greedy policy for sequential decision making by constructing a schedule as a Markov decision process (MDP) using a tuple that includes at least: a first tuple comprising the states at each decision-step that includes the temporal constraints represented by the STN, the locations of the available heterogeneous robot equipment, and all, previously constructed, partial schedules of the available heterogeneous robot equipment, a second tuple comprising actions corresponding to appending the unscheduled task at end of a partial schedule of a selected one of the available heterogeneous robot equipment, a third tuple comprising transitions, corresponding to adding edges associated with each of the actions into the STN and updating the partial schedule of the selected one of the available heterogeneous robot equipment, a fourth tuple comprising a reward of a state-action pair defined as a change in an objective value after taking one of the actions while minimizing the overall process duration and a fifth tuple comprising a discount factor;

employing, by the hardware scheduler, imitation learning to train the Q-network, by scaling up, the heterogeneous graph g from small-scale solutions employed by an expert, to large scale problems solved by grounding, below a total value of the reward, Q-values of alternative actions not selected by the expert while ensuring that a gradient is trained only on alternative, unselected actions with a maximum Q-value, and ensuring that the gradient is propagated through all the alternative unselected actions that have a subset of the Q-values higher than a difference between the total value of the reward and an empirically selected offset constant;

employing, by the hardware scheduler, the graph attention network, the input features, the transitions, and a result of the imitation learning to generate a greedy schedule; and iteratively selecting, by the hardware scheduler, based on the greedy policy, the greedy schedule having assignments of the multi-robot tasks to each of the selected heterogeneous robot equipment, the greedy schedule in accordance with a policy from the group consisting of: a first policy associated with first availability of a first one of the available heterogeneous robot equipment, a second policy associated with a minimum average time on the plurality of unscheduled tasks, a third policy associated with a minimum time on any one of the plurality of unscheduled task, a fourth policy associated with a minimum average time on all of the multi-robot tasks.

13. The non-transitory computer-readable medium of claim 12, wherein the STN-based model comprises (i) a first graph portion that encodes the temporal constraints and (ii) a second graph portion that encodes the task and the available heterogeneous robot equipment.

* * * * *